US009900224B2

(12) United States Patent
Dumitriu et al.

(10) Patent No.: US 9,900,224 B2
(45) Date of Patent: Feb. 20, 2018

(54) SYSTEM AND METHOD FOR IMPLEMENTING AND MANAGING VIRTUAL NETWORKS

(75) Inventors: Dan Mihai Dumitriu, Tokyo (JP);
Romain F. V. Lenglet, Tokyo (JP);
Giuseppe De Candia, Barcelona (ES);
Jacob L. Mandelson, Pasadena, CA (US)

(73) Assignee: Midokura Sarl (CH)

( * ) Notice: Subject to any disclaimer, the term of this patent is extended or adjusted under 35 U.S.C. 154(b) by 545 days.

(21) Appl. No.: 14/236,020

(22) PCT Filed: Aug. 6, 2012

(86) PCT No.: PCT/US2012/049692
§ 371 (c)(1),
(2), (4) Date: Mar. 3, 2014

(87) PCT Pub. No.: WO2013/020126
PCT Pub. Date: Feb. 7, 2013

(65) Prior Publication Data
US 2014/0195666 A1 Jul. 10, 2014

Related U.S. Application Data

(60) Provisional application No. 61/514,990, filed on Aug. 4, 2011.

(51) Int. Cl.
*H04L 12/24* (2006.01)
*H04L 12/46* (2006.01)
*H04L 12/931* (2013.01)

(52) U.S. Cl.
CPC ...... *H04L 41/5038* (2013.01); *H04L 12/4625* (2013.01); *H04L 41/145* (2013.01); *H04L 49/70* (2013.01)

(58) Field of Classification Search
CPC ... H04L 41/145; H04L 45/64; H04L 12/4625; H04L 49/70; H04L 41/5038; H04L 45/02; H04L 12/4641; H04L 45/586; H04L 61/20
See application file for complete search history.

(56) References Cited

U.S. PATENT DOCUMENTS 5,506,838 A * 4/1996 Flanagan ............... H04L 45/02
370/258
7,991,859 B1 * 8/2011 Miller ................. H04L 41/0803
370/252

(Continued)

FOREIGN PATENT DOCUMENTS

| EP | 1775888 | 9/2007 | |
| EP | 2139178 A1 * | 12/2009 | ............. H04L 45/00 |
| WO | 2004092969 | 10/2004 | |

OTHER PUBLICATIONS

Rahman et al. ?Network Modelling and Simulation Tools. ? In: [online]. Dated Jun. 19, 2007(Jun. 19, 2007). Retrieved on Nov. 14, 2012 (Nov. 14, 2012). Retrieved from the Internet at URL://dspace.lib.cranfield.ac.uk/bitstream/1826/3552/1/Network_Modeling_and_Simulati on_Tools-2009.pdf>, entire document, especially p. 2/23, paragraph 4; p. 3/23 paragraph 4; p. 3/23 paragraph 7 to p. 4/23, paragraph 1; p. 4/23, paragraph 3; p. 5/23, paragraph 2-4; p. 7/23, paragraph 2, 4; p. 8/23, paragraph 1, 3-4; p. 9/23, paragraph 2; p. 9/23, paragraph 4 to p. 10/23, paragraph 1; p. 11/23, paragraph 4; p. 11/23, paragraph 8 to p. 12/23, paragraph 1; p. 12/23, paragraph 3-4, 5, 7-8; p. 13/23, paragraph 6 to p. 14/23, paragraph 2; p. 15/23, paragraph 3-4, 6; p. 16/23, paragraph 4-5; p. 17/23, paragraph 2; p. 18/23, paragraph 4, 6; p. 19/23, paragraph 4-5; Table 2.

*Primary Examiner* — Vivek Srivastava
*Assistant Examiner* — Muhammad Raza
(74) *Attorney, Agent, or Firm* — Vorys, Sater, Seymour and Pease LLP; Rex W. Miller, II

(57) ABSTRACT

A system and method for implementing and management virtual networks is disclosed. A method includes receiving a network packet arriving at a first network interface of a first node of an underlying network, communicating at least the packet and an identifier of the first network interface to a decision engine, determining how the packet should be processed based on a simulation by the decision engine of a traversal of a virtual network topology including a plurality of virtual network devices, wherein the decision engine communicates with a shared database accessible from the underlying network that stores the virtual network topology and virtual device configurations for the plurality of virtual network devices; and processing the packet based upon the simulation.

16 Claims, 14 Drawing Sheets

(56) References Cited

U.S. PATENT DOCUMENTS

| | | | | |
|---|---|---|---|---|
| 8,683,023 | B1* | 3/2014 | Brandwine | H04L 45/64 |
| | | | | 709/220 |
| 9,282,027 | B1* | 3/2016 | Brandwine | H04L 45/04 |
| 2001/0052006 | A1 | 12/2001 | Barker et al. | |
| 2003/0035371 | A1 | 2/2003 | Reed et al. | |
| 2006/0146729 | A1 | 7/2006 | Krautkremer | |
| 2007/0140235 | A1* | 6/2007 | Aysan | H04L 45/00 |
| | | | | 370/389 |
| 2010/0061269 | A1* | 3/2010 | Banerjee | H04L 12/4675 |
| | | | | 370/254 |
| 2010/0153701 | A1* | 6/2010 | Shenoy | H04L 12/4633 |
| | | | | 713/151 |
| 2010/0246387 | A1 | 9/2010 | Krishnan | |
| 2011/0286359 | A1* | 11/2011 | Shimonishi | H04L 45/38 |
| | | | | 370/254 |

\* cited by examiner

SYSTEM AND METHOD FOR IMPLEMENTING AND MANAGING VIRTUAL NETWORKS

CROSS-REFERENCE TO RELATED APPLICATIONS

This application is a national stage of PCT Application No. PCT/US2012/049692, filed Aug. 6, 2012, which claims priority to U.S. Provisional 61/514,990, filed on Aug. 4, 2011, the contents of which are incorporated herein by reference.

BACKGROUND AND SUMMARY

The present disclosure relates to networking, and more particularly systems and methods that implement and manage virtual networks.

The advent of cloud-based computing has created new demands for service providers. Service providers would like to provide each customer with a virtual network, with the ability to add hosts and change topology decoupled from the physical network. Virtualization of the network allows service providers to create customer-configurable network topologies which can be changed by altering virtual routers and virtual switches without any change in hardware. Virtual routers also allow segregation of customers' data for security and use-based pricing. Dedicated hardware can provide some of these features but can be expensive. There remains a need for a tool that allows a virtual network to be overlaid over an existing network and allows that virtual network's topology to change independently of the underlying network.

Presently disclosed are a system and method that facilitate packet routing using a virtual network overlaid on a physical network. In various embodiments, the present disclosure provides for the flexible interconnection of network elements at multiple layers of the OSI model, including, L2 (Layer-2, i.e. Link Layer), L3 (Layer-3, i.e. Network Layer) and L4 (Layer-4, i.e. Transport Layer). Network elements may be interconnected with virtual L2 switches and L3 routers. The virtual L2 networks' packets may be transported over the existing L3 network using tunneling, without requiring any changes to the L3 network. Various tunneling methods may be used, such as GRE, Ethernet over IP, VXLan, MPLS over IP or CAPWAP. The Internet Protocol (IP) packets routed by the virtual L3 router may be transported over the existing L3 network, without requiring any changes to the existing L3 network.

In an embodiment, the virtual L2 switches and virtual L3 routers appear to the elements they connect as physical L2 switches and physical L3 routers, although they may not be implemented using physical L2 and L3 network elements. There can be an arbitrary number of virtual network elements (switches or routers), each virtually connected to an arbitrary number of network elements. In one configuration, each virtual L2 switch is connected to one virtual L3 router, which can be connected to an arbitrary number of other L3 routers.

The system's virtual L2 switches and virtual L3 routers can connect a large number of network elements, regardless of geographical separation. The system can connect elements that are either physical or virtual, connecting, for example, virtual machines emulated on server computers to physical routers that are connected to the internet.

A method and system for creating and managing virtual networks comprising a plurality of virtual routers and switches is provided. The method and system may also provide for L3/L4 firewall services, source and/or destination network address translation services, and load balancing as described in more detail below. Presently disclosed is a method of routing a packet from a first node to a second node that comprises receiving a packet at a first node of an underlying network; accessing a virtual routing table to determine a next hop for the packet in a virtual network topology, where the next hop is either an interior facing (logical) port or an exterior facing (materialized) port, and continuing to access subsequent virtual routing tables in series until the next hop is determined to be an exterior facing port on a second node of the network; and sending the packet over the underlying network to the exterior facing port of the second node. The step of accessing a virtual routing table to determine a next hop for the packet may also include executing a lookup in each virtual routing table, where the lookup table contains the next hop data for the packet. In one embodiment, the first node of the network is configured to access an external network, and the second node of the network is configured to host a virtual machine. The method may also include applying a pre-routing modification and/or post-routing modification to the packet for at least one hop in the virtual network. In one embodiment, the next hop for a packet is determined from the source address and/or destination address. In addition, the pre-routing and post-routing processes may utilize the source address, source port, destination address and/or destination port to determine the desired modification or translation of the packet. The method may also comprise storing at least one virtual routing table in a distributed state on a plurality of nodes in the underlying network. In various embodiments, the underlying network may include an Ethernet network, a private IP network, a public IP network, or other networks capable of providing connectivity between the nodes.

Also disclosed is a method of routing packets comprising the steps of receiving a packet of a flow at a first node; accessing a flow table and determining that the packet does not match an existing flow rule; communicating the packet to a decision engine; accessing a virtual network topology stored in a shared database accessible by a plurality of nodes; creating a flow rule for the packet; and communicating the flow rule to the flow table. —The step of creating a flow rule may further comprise determining a routing sequence for the packet in the network based on a virtual topology established by a network tenant.

Also disclosed is a method of stateful connection tracking for deleting a flow entry comprising the steps of receiving a FIN packet with a sequence number at an edge node with a flow configurable switch; identifying a flow rule corresponding to the packet in the flow configurable switch; identifying the flow rule for deletion and communicating the identified flow rule to a distributed state in a shared database; and communicating the packet based upon the corresponding flow rule. In embodiments, the system provides means for simulating a TCP connection state machine and keeping its state in the shared database.

In embodiments, the flow may be an inbound flow or an outbound flow of a TCP connection. The method may further include deleting the identified flow upon receiving an ACK packet corresponding to the FIN packet. In an embodiment, the method also comprises identifying an opposite direction flow stored in the distributed state that corresponds to the identified flow; identifying the opposite direction flow for deletion; and deleting the identified flow and the opposite direction flow upon receiving an ACK packet corresponding to the FIN packet.

In another embodiment, a method of performing destination network address translation comprises the steps of receiving a first packet at a first node, the first packet having a destination address; creating a first flow rule corresponding to the first packet, where the first flow rule comprises an aggregation of the modifications made to a packet traversing a plurality of virtual devices in the virtual network topology; applying the first flow rule to the first packet; receiving a second packet at a second node in response to the first packet, the second packet having a source address; creating a second flow rule corresponding to the second packet; and accessing the first flow from a distributed state and applying the destination network address translation to the source address of the second packet. The method may also comprise waiting until the first flow rule is stored in the distributed state before forwarding the first packet such that the second packet is not received until the first flow rule is stored in the distributed state. In one embodiment, the first packet and second packet correspond to a TCP connection. In another embodiment, the method further comprises, applying a load balancing algorithm to balance loads on the underlying network resources.

DETAILED DESCRIPTION

Figure 1:
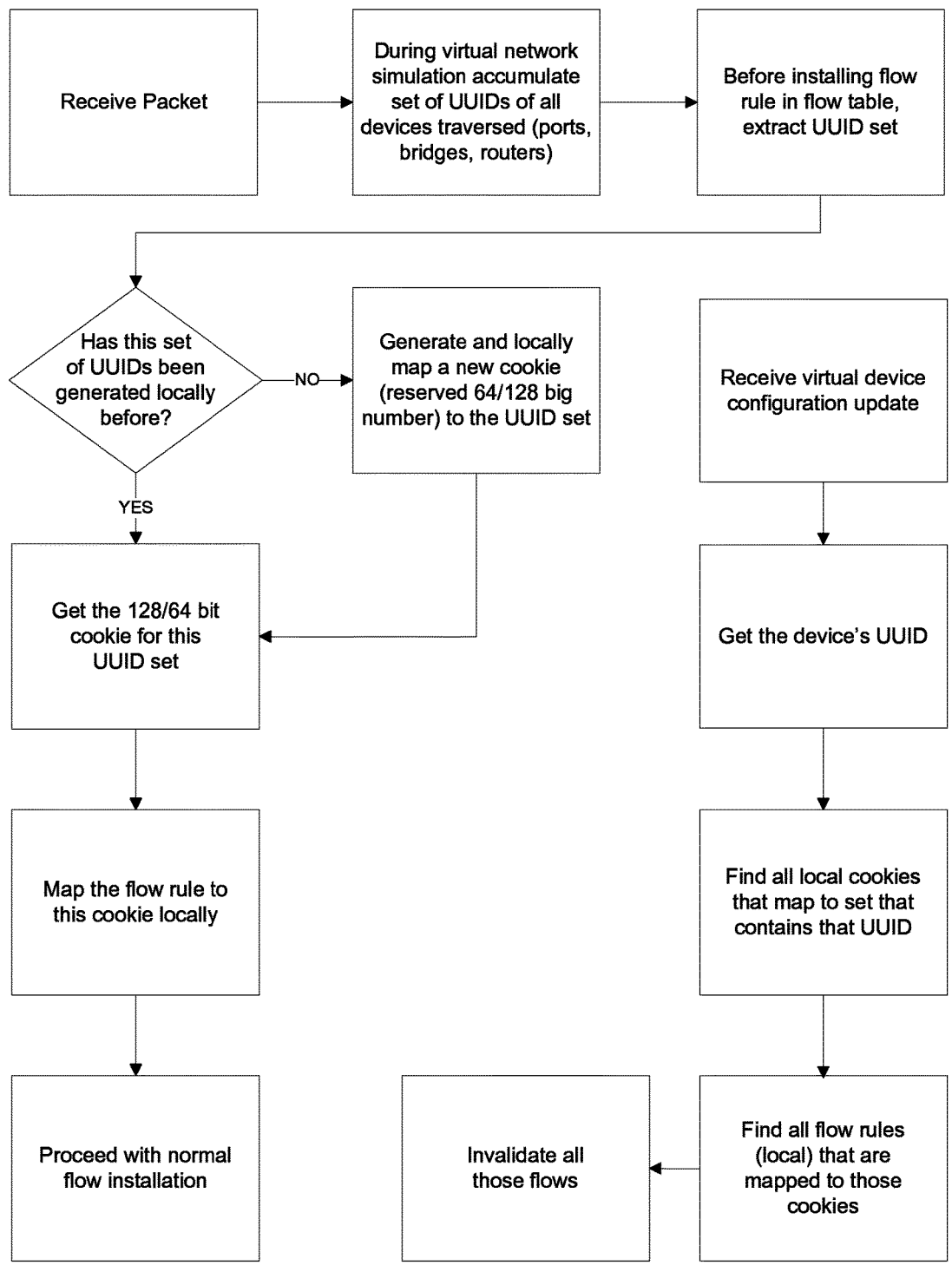
FIG. 1 illustrates an embodiment of a method for invalidating a flow.
Figure 2:
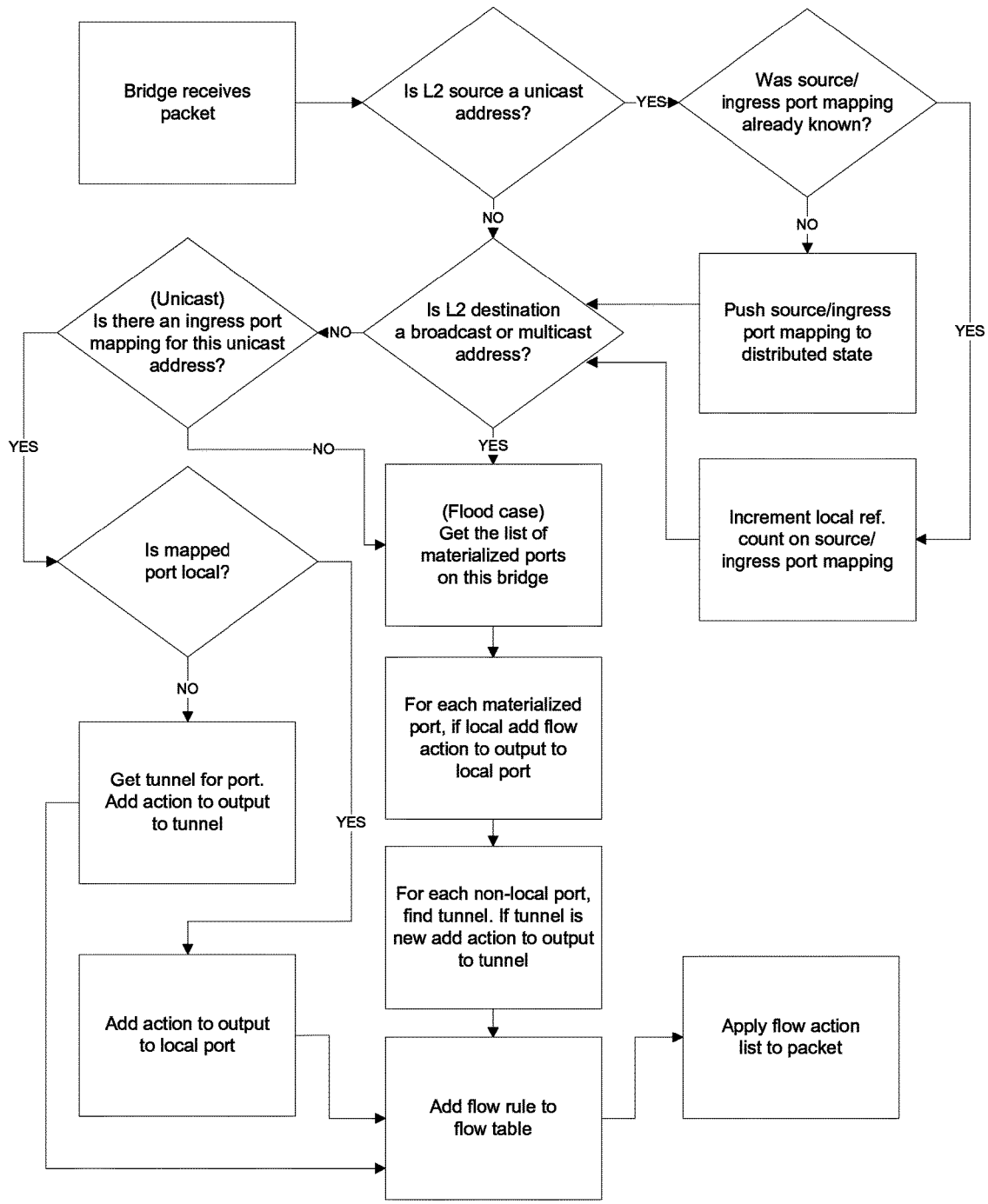
FIG. 2 illustrates an embodiment of a method for MAC-learning.

Referring generally to FIGS. 1 through 14, embodiments of the disclosed system and method relate to computing systems that implement and manage virtual networks and may provide software defined network solutions. The disclosed system and method provides a software abstraction layer for virtualizing a network to improve the effectiveness of cloud computing systems while reducing complexity of physical networks and associated maintenance costs.

In various embodiments, a computing method is disclosed that includes receiving a packet arriving at a first network interface of a first node of an underlying network. The first network interface may be implemented in hardware or software on the first node. A decision engine, may be invoked to determine how the packet will be handled. In one aspect, the packet and an identification of the network interface on which the packet arrived into the network are communicated to the decision engine to be processed. The decision engine may simulate how the packet will traverse the virtual network topology including each of a plurality of virtual network devices encountered by the packet. In addition to simulating how a packet is passed from one device to the next through the virtual network, the decision engine may also simulate how each of the virtual devices affects the packet, such as by modifying the packet protocol headers. Based on the simulation results, the system may process the packet applying each of the determined modifications or an aggregation of the modifications so that the packet maybe emitted from a network interface on one of the nodes of the network, where the specific network interface on which to emit the packet was determined during the simulation by the decision engine.

At each step through the virtual network topology, the decision engine determines how the packet may handled by successive devices. In one example, the decision engine may determine that a packet is to be dropped or ignored. Dropping a packet may result when a given packet is associated with a communication or flow that the system is no longer processing. In other examples, a packet may be dropped because a virtual device lacks sufficient instructions for handling a packet of the type received. Alternatively, a device may be unable to successfully route a given packet to the specified destination. An error message or other response may be provided to alert the sender of the packet that the packet did not reach its destination.

For many packets, the decision engine will determine that the packet should be emitted from a virtual port corresponding to a second network interface. The second network interface may be on the first node or on a second or different node of the underlying network depending upon the packet's destination and the virtual port to host mapping. When the packet is to be delivered to a second network interface on a second node, the decision engine determines how the packet is to be processed and then the packet is delivered by the underlying network to the second node to be emitted by the second network interface.

In multiple embodiments, the packet's protocol headers may be modified before delivery to the second network interface. The modification of the protocol headers may provide for network address translation, tunneling, VPN or other features as discussed more fully below.

In an embodiment, the method includes maintaining a map of node identifiers to node addresses for nodes on the underlying network. Node identifiers may be used to distinguish individual nodes for purposes of routing packets on the underlying network. To deliver a packet from a first node to a second node, the packet may be forwarded as the payload of a tunneling protocol packet (such as Ethernet+IP+GRE). In embodiments, the tunneling protocol packet has a tunnel key that encodes a global identifier of a second network interface. A global identifier may be unique within the network such that each network interface is uniquely identifiable. In contrast, a local identifier may be used within a node, or within a subset of the network to uniquely identify a port or interface within a subset of the network. When the tunneling protocol packet is received at the second node, the payload containing the original packet is extracted along with the tunnel key. The tunnel key may then be decoded to determine the second virtual network interface identifier and the packet emitted from the second network interface. In this manner, the system is able to utilize the decision engine to determine how a packet is to be handled as it traverses the system and also to efficiently transport the packet once the determination is made.

In other embodiments, the decision engine determines that a packet should be emitted from a set of network interfaces. Emitting from a set of network interfaces may be necessary in multicast or broadcast applications. The network interfaces from which the packet should be emitted may be local to a single node of the network, or may be dispersed across two or more nodes. In any case, the system determined that the packet should be emitted from a set of network interfaces corresponding to an interface set identifier. The packet is then processed by delivering the packet to each network interface in the set that is local to the first node. The packet is also forwarded, with modifications, from the first node to the second node, over a tunnel. The packet may forwarded as the payload of a tunneling protocol packet using a tunnel key that encodes the interface set identifier. When the tunneling packet is received at the second node, the tunnel key may be decoded to determine the interface set identifier, and the packet emitted on any network interfaces included in that set that are local to the second node. The set of network interfaces associated with a given interface set identifiers may be stored in the shared database accessible by each node of the system. Therefore if a node receives an unknown interface set identifier, the node may access the shared database to determine which network interfaces are included in the identified set. Moreover, a node may store or cache the mapping of network interfaces to interface set identifiers locally on the node. When the interface set identifier changes, however, the locally cached data is invalidated and the node may access the shared database to retrieve the current or updated mapping of interfaces to interface sets. In embodiments, a virtual network interface may belong to more than one interface set.

In application where the underlying network supports multicasting (such as IP multicast), each interface set identifier may be mapped to a multicast address, and each node of the underlying network may maintain a multicast subscription for each of the interface set identifiers to which at least one of the virtual network interfaces mapped to that node belong. Packets may then be multicast as the payload of a tunneling protocol packet to a second or more nodes. Each node then emits the packet from any network interface corresponding to the interfaces in the set that are local to that node. In various embodiments, the interface set identifiers are uniquely mapped to multicast addresses.

If the underlying network does not support multicast, the decision engine determines the set of underlying network nodes that have local network interfaces that belong to the set of network interfaces to which the packet is to be sent. The packet is then forwarded from the first node to each node in the set of underlying network nodes in a tunneling protocol packet as previously described. Each node then emitted the packet to the corresponding network interfaces associated with the set identified.

The decision engine determines how to handle a given packet based upon a simulation of that packet traversing the virtual network topology. In many applications, multiple packets are associated as a flow and each packet in the flow, where each packet in the flow is to be processed in the same manner, for example, all packets of one direction of a TCP connection. In embodiments, upon receiving the first packet of flow, the system invokes the decision engine to determine how the packet of that flow is to be handled. The decision engine may then store the actions or rules for handling subsequent packets of that flow. The stored actions or rules may stored in the shared database such that the rules are available to all nodes of the system for handling packets of a given flow. Alternatively the rules may be stored locally.

In embodiments, the decision engine's output includes a packet protocol header pattern than can be used to match other packets for which the decision engine's output would be the same as for the first packet. In other words, the packet protocol header pattern may be used to identify packets which will be treated in an identical manner by applying the actions or rules determined for the first packet. In embodiments, the output of the decision engine is the result of the simulation performed to determine how the packet is to be processed. The packet protocol header pattern and the result of the simulation for the first packet are stored. Upon receiving a second packet, the headers of the second packet are compared to the packet protocol header pattern while ignoring fields that change on a per packet basis such as TCP sequence number. If the second packet matches the pattern, then the second packet is deemed to be part of the same flow and the previously stored result of the simulation for the first packet is retrieved and applied to the second packet. The stored result of the simulation may be retrieved from the shared database, a local cache or any other memory suitable for holding the rules to be applied to packets of the flow. In embodiments, the decision engine may apply the flow the rules to the second and subsequent packets in a flow. In other embodiments, however, the simulation associated with the first packet to determine the rules for the flow, and the application of those rules to packets may be divided to improve the speed or efficiency of the system.

The caching or storing of specific simulation results may be determined by the system. For example, the decision engine may hint at which simulation results should be cached. In this context a hint may include a recommendation that a specific result be stored subject to other consideration such as efficiency or available storage capacity. In one example, the system may elect not to store the simulation results for an infrequently used flow. The decision engine may also be informed about which outcomes or simulation results are actually cached or which results have been invalidated or evicted from the cached results. A cached result may be invalidated for a variety of reasons. In one example, an outcome may be evicted to free up storage space for new or more frequently used flows. The performance of the system may degrade as the number of stored flow rules increases therefore in some embodiments, the number of stored flow rules may be limited to increase efficiency and speed of operation.

Over time configuration of the virtual network topology and/or the virtual devices may change. This may cause previously performed simulation results to no longer reflect the proper rules to be applied to subsequent packets for one or more previously established flows. The system may therefore communicate between the shared database, the decision engine, and other components to detect and respond to changes in the cached simulation results. In one example, the decision engine may at any time ask that a specific cached entry be removed based on a change in configuration as reflected in the global state stored in the shared database. When a cached entry is removed, upon receipt of the next packet corresponding to the removed flow, the decision engine would be invoked and the simulation recalculated to determine how packets of that flow are to be processed. The reviewed simulation result could then be stored and applied to subsequent packets matching the packet protocol header pattern associated with the flow.

The system may determine the packet protocol header pattern for a given flow during the simulation of a packet. In embodiments, a packet includes a protocol header having a plurality of fields and the pattern is determined by identifying each of the fields that are read during the simulation by the decision engine. In this manner, each field read as the virtual network topology is traversed is identified, including field read by the plurality of virtual network devices. Each field that is read may be included as part of the pattern. In contrast, fields that are not read and therefore do not affect the handling the packet may be designated as wildcards.

In yet another embodiment, a first packet is received on a second node of the underlying network and the second node generates a protocol header pattern that can be used to identify other packets having the same tunnel key as the first packet. The second node then uses the protocol header pattern to identify a second packet matching the packet protocol header pattern and emits the second (and subsequent) packets from the same local network interfaces from which the first packet was emitted. In this manner, the second node streamlines the process of determining on which ports to emit the second packet and improves the efficiency of the system. In embodiments, a flow programmable switch on the node may rely upon the protocol header pattern in combination with a tunnel key, or may rely only on the tunnel key to identify subsequent packets that will be treated similarly to a first packet.

In another embodiment, while determining the simulation for a first packet, the decision engine may request that a base system generate one or more additional packets from a network interface or set of network interfaces. In embodiments, additional packets may be required to determine the behavior of ports of the network. By requesting additional packets, the decision engine may gain additional information on portions of the network to assist in the simulation process. Each of the additional packets may be processed substantially as described herein, or may be provided with different treatment as necessary for the decision engine to develop the needed information about the network.

In another embodiment, a computing method includes maintaining a shared database accessible from an underlying network having a plurality of nodes. The shared database stores a virtual network topology and virtual device configurations for a plurality of virtual network devices. A network packet arrives at a first network interface of a first node of the underlying network. The method further includes determining an action for processing the network packet based on a simulation of the packet's traversal of the virtual network topology including the plurality of virtual network devices. In embodiments, the action is a flow rule operable in a flow programmable switch operable to process packets received at the node of the underlying network.

The simulation of the packet's traversal of the virtual network topology may be performed by a decision engine, such as the decision engine previously discussed. The decision engine may be operable on each of the plurality of nodes to perform the simulation for packets received on each node. Alternatively, the decision engine may operate on a separate node in communication with each of the nodes that receives packets for which a simulation is required.

The virtual network topology includes a plurality of virtual ports corresponding to the plurality of virtual network devices. Each virtual network device has one or more virtual ports. A virtual ports may be either an exterior facing port associated with a network interface of a node of the underlying network, or an interior facing port associated with a virtual link between virtual network devices. A virtual link represents the logical connection of one virtual port to another virtual port and may also be referred to referred to as a virtual cable.

The shared database stores the virtual network topology and virtual device configurations including the configuration of the virtual ports. In embodiments, the shared database may include one or more of a configuration for each of the plurality of virtual ports including an identification of the virtual port as one of an exterior port or an interior facing port, a configuration for each of the plurality of virtual network devices associated with the plurality of virtual ports, a mapping of network interface identifiers to identifiers of the underlying network nodes, a bi-directional mapping of exterior facing ports to corresponding network interfaces of underlying network nodes, and a mapping of each interior facing port of each device to the peer interior facing port of another device connected by a virtual link. As used here, a peer interior facing port is the virtual port connected to a given virtual port by a logical connection. An interior facing port has a single peer, therefore each interior facing virtual port is the peer of the interior facing virtual port to which it is connected.

The configuration of virtual ports is configurable depending upon the desired configuration of the system, and a system user may define the virtual ports. A packet ingressing/egressing an exterior facing virtual port is entering/exiting the virtual network. In contract, a packet ingressing/egressing an interior facing virtual port remains in the network. In this manner, a virtual port may be characterized as exterior or interior facing depending upon whether packet enter/exit the virtual network when passing through the port.

In one embodiment, the decision engine operates locally on a first node and communicates with the shared database which contains the virtual network topology and device configurations. The shared database may contain an authoritative or master copy of the topology and device configuration information. To improve efficiency, at least a portion of the virtual network topology and virtual device configuration information may be cached locally on individual nodes. The cached data may be updated when the shared database is modified. In one embodiment, only those portions of the topology or device configuration used by a given node are cached on the node. Upon simulation of a packet's arrival at a virtual device, the system may load the configuration of the virtual device from the shared database to the node performing the simulation and may cache the device configuration for future use on the node.

Embodiments of the computing method also include mapping the first network interface of the first node to a corresponding virtual port and retrieving the configuration of the virtual port and the device associated with the virtual port from the shared database. The action for processing the network packet is then determined based upon a simulation of the device associated with the virtual port. The determined action may include one or more of modifying an internal state of a network device, dropping the packet, modifying the packet's protocol headers, emitting the packet from one or more virtual ports of a network device, and emitting a different packet from one or more virtual ports of the network device. In embodiments, emitting the packet from one or more virtual ports of the network device may include emitting the packet from an exterior facing port or an interior facing port.

In determining how to process a packet, the decision engine may traverse multiple virtual devices connected by interior facing virtual ports. In one embodiment, the decision engine determines a peer interior facing port for a second virtual port and retrieves the configuration of the peer interior facing port and the network device on which the peer interior facing port is located. The decision engine may then simulate the operation of the network device associated with the peer interior facing port to determine how the packet is to be processed. In this manner, the decision engine may simulate a route through the virtual network topology including any number of virtual network devices in order to determine how a given packet or flow is to be processed.

If the determined action is to emit a packet from one or more exterior facing virtual ports, the system maps each exterior facing virtual port to a corresponding network interface and a node of the underlying network and then emitting the packet from each of the corresponding network interfaces.

The simulation processes described herein are repeated until the decision engine has simulated the last virtual device traversed by the packet. The decision engine provides a simulation result or action to be applied to the packet and to subsequent packets matching a packet protocol header pattern. The simulation result or action includes an aggregate modification of the packet to modify the packet's protocol header to match the configuration of the headers as the packet would be emitted by the last virtual device, based on all modifications applied through the traversal of the virtual network topology. In this manner, the decision engine determines through the simulation the necessary modification to the packet so that packet may be efficiently modified and routed through the network.

As previously discussed, the packet includes a protocol header having a plurality of fields. The system determines a packet protocol header pattern used to identify packets for which a determined action or flow rule will be applied based on the simulation result. In one embodiment, the system determines the packet protocol header pattern by identifying each of the field of the protocol header that were read during the simulation of the virtual network topology and the virtual network devices. In this manner, the fields of the protocol header that are relied upon in traversing the network are identified so that the determined flow rule may be applied to packets that should be processed in the name manner. Those fields of the protocol header that are not relied upon may be treated as wildcards or otherwise excluded from consideration in the process of matching the protocol header of subsequent packets to the determined pattern. The packet protocol header pattern and the corresponding simulation result may be stored on the node. In an embodiment, the pattern and corresponding simulation result are stored as flow rule for use in a flow configurable switch configured to process subsequent packets arriving at the node. When a packet arrives at a node for which a flow rule has not been created, the system may invoke the decision engine to perform a simulation for the packet.

The simulation result produced by the decision engine is dependent upon the virtual network topology and the virtual device configurations, at least for those virtual devices traversed during the simulation. When the topology or device configurations change, the previously determined simulation result and corresponding actions to be applied to a packet may no longer be correct. To accommodate such changes, the system is configured to invalidate a stored packet protocol header pattern and the corresponding stored simulation result upon a change in the virtual network topology or virtual device configurations. In one embodiment, the system invalidates all stored patterns and simulation results upon detecting a change. In other embodiments, only those stored results that relied upon the changed virtual device are invalidated. In one example, the traversed set of virtual devices traversed during the simulation is determined during the simulation by the decision engine. The traversed set of virtual devices is then associated with the packet protocol header and/or the simulation result. When a change in the configuration of a virtual device is detected, the stored simulation results associated with any traversed set containing the changed virtual device may be invalidated. In this manner, the system efficiently determined which flow rules should be invalidated based upon a given virtual device change. A method of determining a traversed set of virtual devices and a invalidating flows based upon a change in a virtual device configuration are further illustrated in FIG. 1. In other embodiments, flows may be invalidated or evicted when the cache is a space limited resource. For example, the system may locally (on the first node) track all the decision engine's that are cached by the underlying system, track a 'last matched' time of a decision which is the last time a packet matched a decision's pattern and the decision's actions were applied to that packet. The system may then query the 'last matched' time of all decisions and evicting those decisions that have not been used in the longest time. Querying the last matched time may be performed at a specified frequency or may be performed as needed to maintain the size of the cache of stored decisions below a specified size. The system may also remove random decisions that were 'recently' created. Removing recently created random decisions may be efficient when a majority of recent decisions are for short-lived packet flows (compared to older surviving decisions that have a comparatively higher percentage of long-lived flows). The processes for invalidating flows may used individually or in combination to manage the cache of data stored on the node within desired parameters. The system may also adjust the rate of invalidations or evictions based on the rate of new invocations of the decision engine, which correlate to the addition of new decisions to the stored cache.

The system is also configured to efficiently and with minimal disruption to correct traffic converge the cached decisions to be consistent with respect to updated virtual device configurations. The convergence of cached decision, which may be characterized as correctness-based invalidations or evictions of previously stored flows. As used herein, a consistent decision, with respect to a starting virtual network configuration plus some change, is one that could be reached again by a new invocation of the decision engine with the same input packet and ingress interface. In contrast, an inconsistent decision is a decision that the decision engine would not make given the same inputs due to the new configuration of the virtual network devices. In one embodiment, for a time T there is a bounded period P within which all decisions that were cached before time T are consistent with the state of the virtual network configuration at or after time T. To converge the decisions, the system indexes the locally cached decisions by the devices that were simulated for that decision (these represent the virtual devices that were traversed by the packet) and the time at which the decision was made/cached. The system then receives local updates of virtual device configuration for a first virtual device's configuration update received at time T, waits a specified time so that the number of decisions made and cached before time T has already been reduced by space-based evictions, and then intersects the set of decisions made/cached before time T with the set of decisions that required simulating the first virtual device. The decisions in the resulting set must then be validated by re-invoking the decision engine with the same inputs (and the current configuration). For any decisions that have changed, the old decision is invalidated and the new simulation result based on the updated, current configuration is installed/cached for use with subsequent packets matching the flow.

In another aspect, the computing method and system presently disclosed includes simulating one or more MAC-learning bridges, where each bridge's exterior facing ports are mapped to interfaces of one or more nodes of the underlying network and where each interior facing port of the bridge is connected to an interior facing port of a virtual router. The computing method includes maintaining an authoritative copy of the bridge's MAC-learning table in the shared database. The MAC-learning table may also be known as a dynamic filtering database, map of MAC address to the port via which that MAC can be reached, where a MAC is reachable via only one of a bridge's ports at any one time in a correctly configured network. The method further includes maintaining a cached copy of the bridge's MAC-learning table in every node that has an interface that maps to one of the bridge's exterior-facing ports, and in every node that simulated a packet's traversal of that bridge. The cached copy of the MAC-learning table may be updated when the authoritative copy changes.

In an embodiment, the invocation of the decision engine results in the simulation of an Ethernet frame arriving at a first port of an Ethernet bridge, and the system loads the state of the Ethernet bridge if no previous decision engine invocation has loaded it. An incoming Ethernet frame may have a unicast destination MAC address. In embodiments, a method further includes detecting that the destination MAC is a unicast address, and determining whether there is an entry for that MAC in the MAC-learning table. If the MAC-learning table includes an entry mapping the MAC to a second port of the bridge, the system determines that the simulated bridge would emit such frame from the second port. If the MAC-learning table does not include an entry for that MAC, the system determines that the simulated bridge would emit the frame from all its ports, except the one on which it arrived.

In another embodiment, the incoming Ethernet frame has a multicast or broadcast MAC indicating that the frame should be emitted from multiple ports. Embodiments of the computing method may further include detecting that the destination MAC is a multicast or broadcast address and determining that the simulated bridge would emit such frame from all its ports except the one on which it arrived. In yet another embodiment, the incoming Ethernet frame has a unicast source MAC address. If the MAC-learning table has no entry for this MAC, the system adds an entry that maps this MAC to the arrival port. The system then initiates a reference count of such MAC-learning table entry, local to the node where the invocation occurred, where the count is based on the number of cached decisions that resulted in a frame with the same source MAC address arriving on the same port. Reference counting such cached decisions may be useful because the decision engine does not see all packets with the same source MAC arriving on the port. Therefore, when the number of such cached decisions reaches zero, the MAC-learning table entry for this source MAC and arrival port may be expired (or set to expire). On every node that has a cached copy of the bridge's MAC-learning table (because it has an interface mapped to an exterior port of the bridge, or because it recently simulated the bridge) the system learns the update to the table and evicts any cached decisions that were based on the absence of an entry for that MAC in the MAC learning-table, because those flows/packets can now be delivered to the entry's port, instead of flooded to all the bridge's ports.

Figure 3:
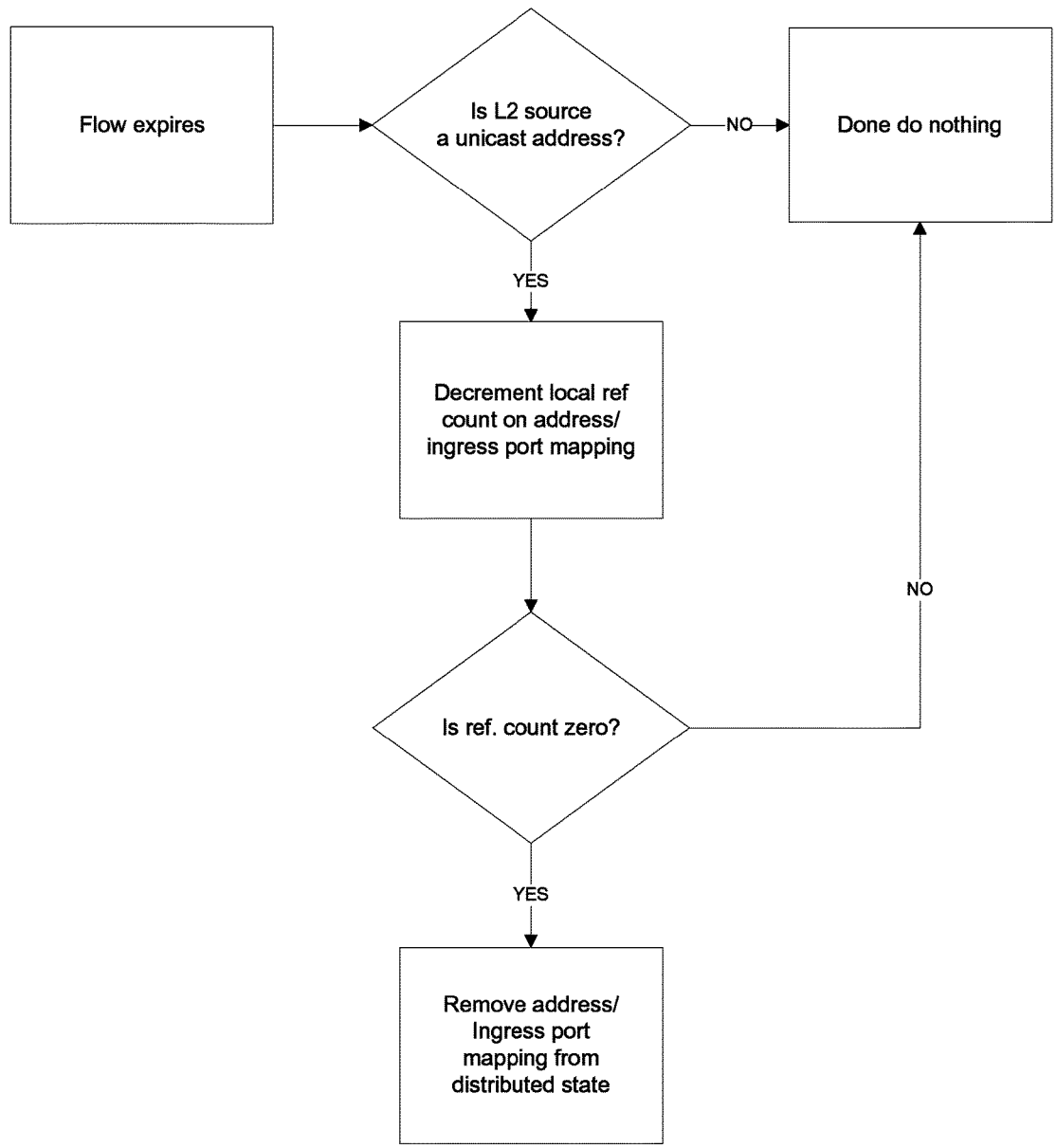
FIG. 3 illustrates an embodiment of a method for MAC-unlearning.

In other embodiments, the MAC-learning table may already have an entry for the MAC address and the mapped port is the same as the arrival port of the current incoming frame. The system may then detect that the MAC-learning table entry exists and need not be modified. The system may increment the local reference count if this invocation of the decision engine results in a cached decision. Alternatively, the MAC-learning table may already has an entry for the MAC address but the mapped port may be different from the arrival port of the current incoming frame. The system then removes the previous entry from the MAC-learning table, and adds a new entry to the MAC-learning table that associates the MAC address with the arrival port of the frame. On the Node that owns the interface that corresponds to the previous entry's mapped port, the system learns about the entry's removal and evicts any decisions that are reference counting that entry since they are now based on incorrect information. On every node that has a cached copy of the bridge's MAC-learning table (because it has an interface that corresponds to an exterior port of the bridge, or because it recently simulated the bridge) learn the updates to the table and evict any cached decisions that were based on the previous MAC-learning table entry for that MAC since they are now based on incorrect information. To further illustrate, a method for MAC-learning illustrated in FIG. 2 and a method for MAC-unlearning is illustrated in FIG. 3.

In another embodiment, a method to reduce flooded packets on Ethernet bridges when the MAC addresses that are reachable from each of a bridge's ports are known in advance is provided. For example, in the case of a guest VMs attached to one of a Node's network interfaces that is mapped to one of a virtual bridge's exterior-facing ports the MAC addresses may be known in advance such that the MAC-learning table may be prepopulated with the known MAC-port entries.

In another aspect, the computing method reduced flooded packets on an IP network by intercepting and responding to ARP requests. The method includes augmenting a bridge's state with an ARP cache stored in the shared database. The ARP cache includes a map of unicast IP address to unicast MAC address. As with the MAC-learning table, the bridge's ARP cache may be prepopulated with entries corresponding to any routers that are connected to the bridge via interior facing ports. Each entry can be determined by examining one of the bridge's interior facing ports, retrieving the configuration of the peer port, and extracting the peer port's MAC and IP address. The method may also include prepopulating the bridge's ARP cache with any other entries that are known in advance, such as in a cloud management framework where guest virtual machines are assigned MAC and IP addresses by users or automatically by the system. The method may also include recognizing IP packets and extracting the source IP address and the source MAC address of the encapsulating Ethernet frame and thus inferring the IP-MAC correspondence and adding the appropriate entry to the ARP cache.

In yet another embodiment, a method to simulate one or more IPv4 routers where each router's exterior-facing ports are mapped to interfaces of one or more nodes of the underlying network, and each interior-facing port of a router is connected to an interior-facing port of either another virtual router or a virtual bridge. The method includes maintaining an authoritative copy of the router's ARP cache (map of unicast IP address to unicast MAC address) in the shared database, —pre-loading the ARP cache with the (IPv4, MAC) address pairs of the peer ports of all the router's interior-facing ports, maintaining an authoritative copy of the router's forwarding table (set of rules/routes that determine which router port should emit a packet based on picking the rule with the most precise matching IPv4 destination prefix and a matching source prefix) in the shared database, maintaining a cached copy of the router's ARP cache and forwarding table in every node that has an interface that maps to one of the router's exterior-facing ports, and in every node that recently simulated a packet's traversal of that router. A router has been recently simulated on a node if that node has at least one cached engine decision that required simulating the router. The method may also include updating the cached copy of the ARP cache and the forwarding table when the authoritative copy in the shared database changes. Upon simulation of a packet's arrival of an IPv4 router, the state of the router may be loaded in this node if no previous decision engine invocation has already loaded it.

The decision engine may also simulate an IPv4 packet arriving at a first port of an IPv4 router. The incoming IPv4 packet's destination address may be equal to one of the router's ports. The system would then detect that the packet is addressed to one of the router's ports, determine that the router would drop the packet if its protocol is unrecognized or unhandled, detect whether the packet is a ping (ICMP echo) request and in that case generate a ping reply packet from the router's port to the IPv4 source address of the first packet, and invoke the decision engine's simulation logic to determine the path the ping reply would take from the port through the virtual network. If the simulation logic determines that the ping reply would exit the virtual network at a specific exterior-facing port (of any device), then the system would map that port to its corresponding interface and underlying network node and request that the calling system emit the ping reply packet from that interface. Alternatively, the incoming IPv4 packet's destination address may not be one of the router's ports' addresses in which case, the system queries the router's forwarding table to determine the best matching route given the packet's source and destination IPv4 addresses. Where no matching route is found, the system determines that upon receiving the first packet the router in question would drop the packet and respond with an ICMP error, such as route unreachable, and invoke the decision engine's simulation logic to determine the path the ICMP error would take from the port through the virtual network. If the simulation logic determines that the ICMP error would exit the virtual network at a specific exterior-facing port, then the system maps that port to its corresponding interface and underlying network node and requests that the calling system emit the ICMP error packet from that interface. In a similar manner, an ICMP error packet may be generated when the matching route specifies that the destination is administratively prohibited.

When the simulation determines that the best matching route specifies that the packet be forwarded via a router port (e.g. next hop port), the system may change the packet's source Ethernet address to the MAC of the next hop port. If the next hop gateway of the route is null (meaning that the destination address is on the same L3 subnet as the next hop port), the system queries the local ARP cache for the MAC corresponding to the packet's IPv4 destination and changes the packet's destination Ethernet address to that MAC. If the next hop gateway of the route is not null (meaning that the packet must be forwarded to pass through at least one more router before reaching its destination), the system queries the local ARP cache for the MAC corresponding to the gateway's IPv4 address and changes the packet's destination Ethernet address to that MAC. The system may further determine that upon receiving the first packet (which may have be modified after the simulation of previously traversed virtual devices), the router in question would further modify the packet as described and emit it from the next hop port.

Where the ARP cache does not contain an entry for the queried IPv4 address, such as when the next hop port is an exterior facing port), the system may implement a method that includes generating an ARP request packet for the desired IPv4 address, and adding an (IPv4, null-MAC) pair, annotated with a last-send time set to the current time, to the shared database to indicate when the last ARP request was sent for that IPv4. The method may further include mapping the exterior facing next hop port to its corresponding interface and underlying network node, requesting that the calling system emit the ARP request from that interface, and periodically repeating the request that the ARP request packet be emitted from that interface. In embodiments, the ARP request will be delivered by the base system like any other packet that entered the virtual network, and therefore possibly over a tunnel to a different node. The method may continue until a timeout occurs, and then generate an ICMP route unreachable error message in response to the first packet. Alternatively, the method continues until an update for the local copy of the ARP cache that includes an (IPv4, MAC) entry for the desired IPv4 address is received, and then include changing the packet's destination Ethernet address to that entry's MAC, and determining that the simulated router would modify the packet as described and emit it from the next hop port. In embodiments, the ARP reply will be received at a different node than the one processing the first packet if the ARP request was emitted from a port that is mapped to an interface on a different node. In this manner, the decision engine is able to learn the ARP entry via the ARP cache rather than by directly receiving the ARP reply. When a timeout occurs and the ARP cache entry is not found, the system may respond with a route unreachable ICMP error as previously described In another embodiment, an invocation of the decision engine results in the simulation of an ARP request packet arriving at a first port of an IPv4 router and where the ARP's target protocol address ("TPA") is the IPv4 address of the arrival/first port. The system may then generate an ARP reply packet with a source hardware address ("SHA") set to the arrival port's MAC address, invoke the decision engine's simulation logic to determine the path the ARP reply would take from the arrival port of the first packet through the virtual network. The ARP reply may be emitted in a similar manner as the responses previously discussed. Alternatively, the decision engine simulation may determine that the simulated router would drop the ARP request packet.

In other embodiment, an invocation of the decision engine results in the simulation of an ARP reply packet arriving at a first port of an IPv4 router. The system may detect whether the ARP reply is in response to an ARP request that was generated by the router. In one embodiment, the system checks that there is an (IPv4, MAC) entry in the ARP cache, annotated with a recent last-send time, even if the MAC itself is null. If there is no entry, the system determines that the router would drop such an unsolicited ARP reply in order to block denial-of-service attacks. Alternatively, the system extracts the source hardware address, a MAC address, and the source protocol address, an IPv4 address. from the ARP reply and updates the ARP cache. The ARP cache may be updated locally and in the shared database with the (IPv4, MAC) entry.

In an another aspect, the presently disclosed computing system is configured to perform a method that includes simulating ingress and egress filters of a virtual device, where the filters include individual filtering rules that are organized into lists that may reference each other via jump rules. The method may also include specifying a condition that may read and apply logic to any or all fields of a packet's L2-L4 network protocol headers, and specifying an action to be executed (e.g. DROP, ACCEPT for further processing) when a packet matches the condition.

Figure 4:
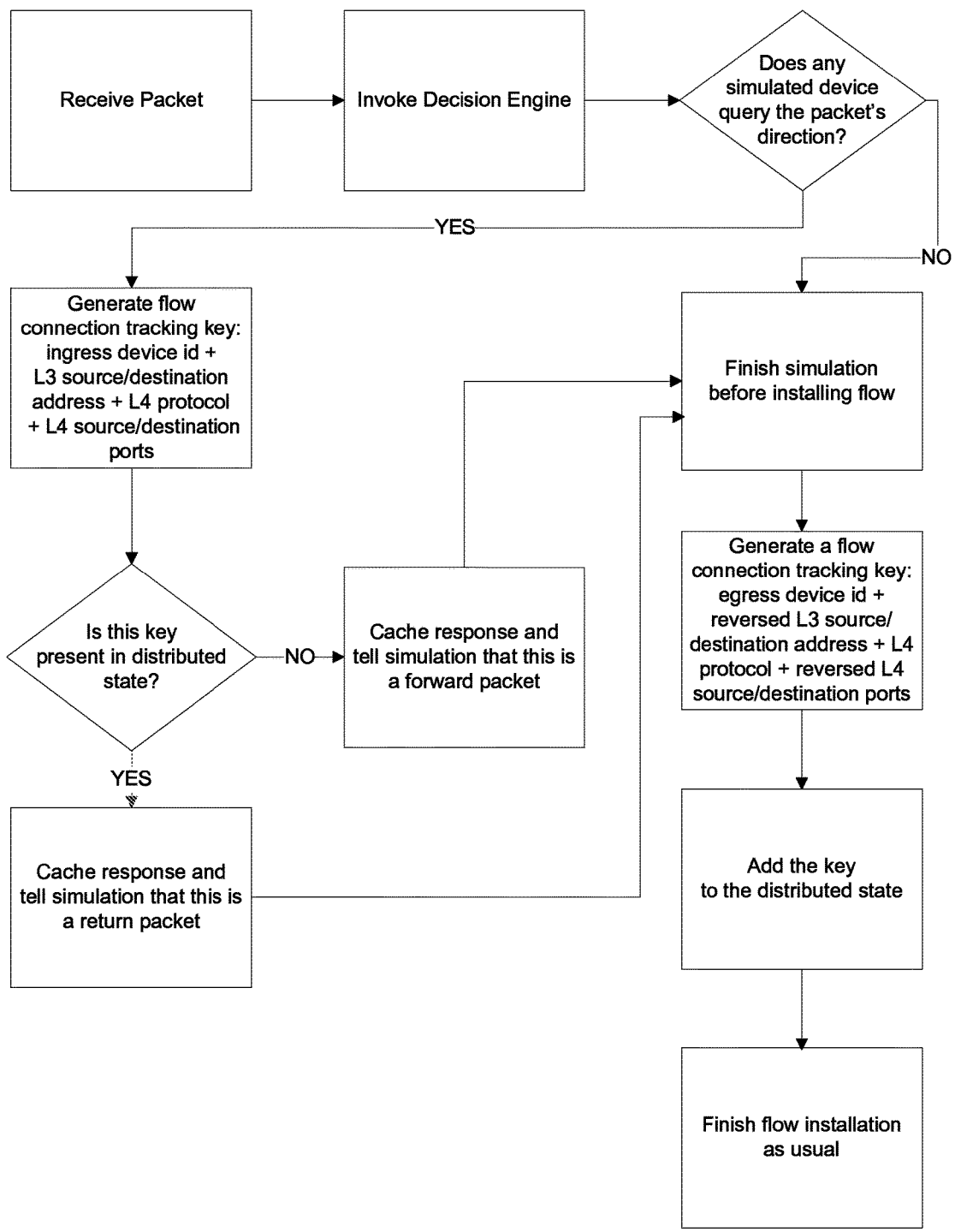
FIG. 4 illustrates an embodiment of a method for connection tracking.

In an embodiment, the method further comprises maintaining the filtering rules for each device's ingress/egress filter in the shared database, maintaining a local copy of a device's filtering rules on any node that has recently simulated the device, updating the local copy of a device's filtering rules when the authoritative copy of the rules changes in the shared database, and/or re-validating locally cached flow forwarding decisions that required simulation of a device, when that device's filters are modified. The method may also include simulating filtering rules that match on per-flow connection-state, where per-flow connection-state is tracked independently by each simulated device, and where the set of connection-state values depends on the transport (L4) protocol of the packet. In one embodiment, the system is configured to perform a method that includes having dedicated space in the central database for storing per-device-and-flow connection state, upon beginning the simulation of a device, query the central database using the packet's flow signature to retrieve the connection-state. In one embodiment, the flow signature is computed by appending these fields in this order: the device ID of the simulated device, the packet's L3 header's (e.g. IP) source field, L3 destination field, L4 protocol type (e.g. TCP), L4 header's source field, L4 header destination field. If no connection-state is found in the central database, then the packet constitutes a new flow whose connection-state is implicitly the 'start' value of the set of states for this packet's network protocol. The method may also expose the connection-state value for matching by this device's filtering rules. Before ending the simulation of the device, and if the simulation determines that the device would forward the packet, the connection state is set for this packet's flow signature and this packet's return flow signature according to the transition rules for the set of connection-state values for this packet's network protocol. In a similar embodiment as above, the packet's return flow signature would be computed by appending these values in this order: the device ID of the simulated device, the packet's L3 header's destination field, L3 source field, L4 protocol type, L4 header destination field, and L4 header source field. The forward flow signature and return flow signature may also be defined using additional fields that may be useful in a given application. When the cached decision for the forward flow expires, the system may schedule the removal of both the connection-state associated with that flow and the return flow. To further illustrate, one embodiment of a method for tracking connections is illustrated in FIG. 4.

In an embodiment, the method further includes simulating filtering rules that match on the packet's flow's connection-state, where per-flow connection-state is shared among all the simulated devices, and where the set of connection states depends on the transport (L4) protocol of the packet. In this manner, connection state is viewed as a property of the flow, independent of the path taken through the network of devices. The result is that all devices simulated in a single call to the decision engine will agree on the packet's flow's and return flow's connection-states; and any two devices simulated in two different calls to the decision engine will agree on those connection-states if at least one of the following is true: the return flow ingresses the virtual network at the same device from which the forward flow is emitted; the return flow packets have public, i.e. globally unique, L3 addresses. In embodiments, the shared database includes dedicated space for storing per-flow connection-state. Upon beginning the simulation of the packet's traversal of the virtual network, the shared database may be queried using the packet's flow signature. The flow signature may depend upon the device ID of the first simulated device if at least one of L3 source/destination are not public, i.e. globally unique. The flow signature may also depend upon the packet's L3 header's (e.g. IP) source field, L3 destination field, L4 protocol type (e.g. TCP), L4 header's source field, and L4 header destination field. If no connection-state is found in the central database, then the packet constitutes a new flow whose connection-state is implicitly the start value of the set of states for this packet's network protocol. The connection-state value for matching by any simulated device's filtering rules may then be exposed. Before ending the simulation of the packet's traversal of the virtual network, and if the simulation determines that the packet would finally be emitted from some virtual port, the connection state is set for this packet's flow signature and this packet's return flow signature according to the transition rules for the set of connection-state values for this packet's network protocol. The connection-state is written to the shared database before the packet is tunneled/forwarded (and hence before returning the decision) in order to avoid a race condition where a packet from the return flow is simulated and triggers a query to the connection-state before the connection-state write to the shared database has been completed. The packet's return flow signature may be computed in a similar manner. As noted above, when the cached decision for the forward flow expires, schedule removal of both the connection-state associated with that flow and the return flow.

In another aspect, the method includes reducing simulation time by avoiding querying or writing a connection-state when this state will not be used by the packet's simulation or by a return packet's simulation, by delaying querying the connection-state for the packet's flow until a filtering rule in some simulated device needs to read such state, determining whether the likely path for the return packet will include simulating a filtering rule that needs to read the return flow's connection-state, and in the negative case omitting the write of both forward and return flow connection-state to the shared database. In embodiments, the connection-state is kept in the shared database so that if any packets from the same flow arrive at an interface of a second node at a later time, the second node's decision engine will reach the same decision about how to treat that flow (in the absence of virtual network configuration changes). This is necessary to preserve the integrity of a flow when its packets arrive at the interfaces of more than one node of the underlying network because of external routing decisions. Those routing decisions may or may not be related to the perceived or real unreachability of a node's interface.

In still other embodiments, the system is configured to perform a simulation of network (i.e. L3) and transport (i.e. L4) address translation for a virtual device. Similarly the system is configured to simulate reverse translations of the network and protocol addresses of a virtual device. These processes may be collective referred to as "NAT." In various embodiments, the individual NAT rules may follow or precede or be interspersed with filtering rules, specify a condition that may read and apply logic to any or all fields of a packet's L2-L4 network protocol headers, specify how the L3 and L4 fields should be translated or reverse translated when a packet matches the condition, and/or specify an action to be executed when translation has occurred (e.g. ACCEPT for further processing by the device, CONTINUE processing in the rule-set). The method may further include maintaining the translation rules for each device's ingress/egress filter in the shared database, maintaining a local copy of a device's translation rules on any node that has recently simulated the device, and updating the local copy of a device's translation rules when the authoritative copy of the rules changes in the shared database. During the simulation of the device, if the packet processing reaches the NAT rule, the method includes determining whether the packet (possibly already modified by previous devices or rules) satisfies the rule's condition and in the affirmative case modifying the packet according to the translation or reverse-translation specified by the rule. Locally cached flow forwarding decisions that required simulation of a device may then be revalidated when that device's translations are modified.

In another aspect, the system implements a physically distributed virtual device that supports stateful destination NAT, in which some NAT rules allow a choice of translation target for L3 and L4 destination addresses and specify a policy for making the choice between translation targets. In embodiments, the system may store the translation choice for each forward flow in the shared database, keyed by both the forward and return-flow signatures. The forward flow signature may be composed of these values in this order: the virtual device's ID, the packet's L3 source address, L3 destination address, L4 protocol number, L4 source address, and L4 destination address. The return flow signature may be composed of these values in this order: the virtual device's ID, the L3 address chosen by the translation, the packet's L3 source address, L4 protocol number, the L4 address chosen by the translation, the packet's L4 source address. The stored translation may encodes the packet's original L3 and L4 destination addresses as well as the L3 and L4 destination addresses chosen for the translation. The method further includes during the simulation of a device, if the packet processing reaches such a NAT rule (that allows a choice of destination addresses) and satisfies the rule's condition, composing a key as described above for the forward flow signature and querying the shared database to determine whether a translation has already been stored (and hence the choice of translated addresses has already been made) by a previous decision engine execution (at the local or some remote underlying network node). If such a stored translation is found in the shared database, then modifying the packet's L3 and L4 destination addresses to the chosen L3 and L4 addresses, and then continuing the simulation. If such a stored translation is not found in the shared database, then making a choice according to the specified policy, modifying the packet's L3 and L4 destination addresses according to that choice, storing the translation choice to the shared database as previously described, and then continuing the simulation. During the simulation of a device, if the packet processing reaches a reverse-translation rule that specifies reversing a choice, and the packet satisfies the rule's condition, then assuming that the packet is a return packet of a translated forward flow, composing the key that correspond to the return-flow signature, and querying the shared database to determine whether a translation has been stored for that return flow. The return flow signature may be composed of these values in this order: the virtual device's ID, the packet's L3 source address, L3 destination address, L4 protocol number, L4 destination address, and L4 source address. If such a stored translation is found in the database, then applying it in reverse to this packet by taking modifying the packet's L3 and L4 source addresses to the stored translation's original L3 and L4 addresses, and then continuing the simulation. If such a stored translation is not found in the shared database, then the assumption that the packet is a return packet of a translated forward flow is incorrect, so no reverse translation need be applied, and therefore continuing the simulation as if the reverse rule's condition had not been satisfied. In this manner, the system and method allow for storing the translations in a shared database and dealing with race conditions such that the virtual device behaves correctly and is indistinguishable from a correctly functioning hardware device, but with increased availability of the virtual device as compared to a hardware device.

In another aspect, some NAT rules allow a choice of translation targets for the L3 and L4 source addresses and specify a policy for making that choice. In embodiments, the system may store the translation choice for each forward flow in the shared database, keyed by both forward and return-flow signatures. The stored translation encodes the packet's original L3 and L4 source addresses as well as the L3 and L4 source addresses chosen for the translation. During the simulation of a device, if the packet processing reaches such a NAT rule (that allows a choice of source addresses) and satisfies the rule's condition, a key is composed as described above for the forward flow signature and querying the shared database to determine whether a translation has already been stored (and hence the choice of translated addresses has already been made) by a previous decision engine execution (at the local or some remote underlying network node). If such a stored translation is found in the shared database, then the packet's L3 and L4 source addresses are modified to the chosen L3 and L4 addresses, and then continuing the simulation. If such a stored translation is not found in the shared database, then a choice is made according to the specified policy, building the return flow signature according to that choice and querying the database to make sure no translation is stored by that key, repeating the choice and database check until the database returns no match for the key, then modifying the packet's L3 and L4 source fields according to the final choice, storing the translation choice to the shared database as previously described, and then continuing the simulation. The check for the return flow key in the database may be used for correctness and to avoid ambiguity in routing return flows. During the simulation of a device, if the packet processing reaches a reverse-translation rule that specifies reversing a choice, and the packet satisfies the rule's condition, then assuming that the packet is a return packet of a translated forward flow, a key is composed that corresponds to the return-flow signature, and the shared database is queried to determine whether a translation has been stored for that return flow. If such a stored translation is found in the database, then the stored translation is applied in reverse to this packet by modifying the packet's L3 and L4 destination addresses to the stored translation's original L3 and L4 addresses, and then the simulation is continued. If a stored translation is not found in the shared database, then the assumption that the packet is a return packet of a translated forward flow is incorrect, therefore no reverse translation need be applied, and therefore the simulation may be continued as if the reverse rule's condition had not been satisfied.

In yet another aspect, the number of attempts that select L3 and L4 address translations that are already in the database may be reduced by segmenting the L3 and L4 address ranges into blocks that can be reserved by individual nodes. When choosing L3 and L4 addresses for translation, a node locally checks whether there are unused address combinations in its own block, otherwise it reserves a new block. Often, this result in one round trip communication o the database. If the node cannot reserve a new block and has no unused L3 and L4 address combinations available for a new translation, then it attempts to use a random L3 and L4 address combination within the constraints specified by the rule.

In embodiments, routing protocols operate globally in that they are designed and studied in terms of their global effects on establishing and maintaining connectivity and network stability. Any single router however need only maintain a router protocol discussion with its immediate peers. An organization may operate routing protocol sessions with its neighbor networks for a variety of reasons. As examples, it can hint to neighbors the best path into its network for specific address blocks, and it can adjust its own forwarding decisions based on external network conditions. These routing sessions are inherently stateful, both because the discussion may be held over a connection (such as TCP) as opposed to a connection-less protocol (such as UDP) and because the goal is to exchange state that the routers then use to decide where to forward packets. In embodiments, the system uses an appliance model to implement routing protocols. In an appliance model, L2 isolation is provided for the set of virtual networks running on the underlay. In the case of the routing protocols, the appliance model may be beneficial because the routing protocol is a specific piece of logic and one where the virtual device itself is the source and destination of traffic. In one embodiment, instead of putting an entire L3 router in an appliance, just the routing protocol between a virtual port and some external peer is put into an appliance. In this manner, the system is more fault tolerant in that although the appliance may be a single point of failure doesn't matter, the routing protocols take this into account by allowing multiple sessions between peers over multiple ports.

The system may be further configured to support routing protocols (e.g. BGP, iBGP, OSPF) in virtual IPv4 routers by implementing a method that includes storing configuration parameters for a desired routing protocol and peer session as part of the configuration of the virtual port via which the router will establish the session with its peer. This information may be stored in the shared database. The method may also include storing the desired advertised routes with the routing protocol session configuration in the shared database, when an underlying network node has a public interface that maps to a virtual port with configuration for a routing protocol session, the node locally launches a routing protocol daemon in a container (e.g. in a VM). The container gets a 'private' interface on the host, and the nodes sets up forwarding decisions that allow packets from that routing protocol session, and optionally a few other flows like ARP and ICMP, to flow between the container and the peer bypassing the decision engine. The method may also include routing protocol session configuration on a port implies that the peer's packets will arrive at the corresponding underlying node interface. Similarly, session packets from the virtual router port to the peer must be emitted via the corresponding underlying node interface. However, network traffic from the peer to the virtual network will also arrive at the same interface, and traffic from the virtual network that the virtual router's forwarding table indicates should go via the peer must be emitted by that same interface. The first packet of every regular flow (non-routing-protocol flow) will result in a decision engine call. Instead, the packets of the routing protocol flows bypass the decision engine. Those that arrive at the public interface are emitted directly from the private interface, and vice versa. The node also probes the container to both push the virtual port's advertised routes for that routing-protocol session and to view the routes learned by the routing-protocol daemon running in the container (i.e. the routes advertised by the peer). The node processes (e.g. aggregates) the routes advertised by the peer and adds them to the forwarding table of the virtual router after setting their egress port to the ID of the virtual port that has the routing-protocol session configuration. If the container or session fails, the node removes all such routes that it itself may have added to the forwarding table. The result is that the peer perceives the router's port as sending and receiving both regular (end-host) traffic and routing-protocol session traffic. Since the routing-protocol session traffic is configured per port, a virtual IPv4 router may have more than one port with a configured routing-protocol session with one or more peers. By mapping those virtual ports to interfaces on different underlying network nodes the virtual router is not a single point of failure like a physical router. This further improves the fault tolerance of the system as compared to previously available systems.

In yet another aspect, the system provides methods for implementing or mimicking a virtual private network ("VPN"). In one embodiment, a method to link a virtual devices to a remote network in a different part of the internet is provided that allows the virtual device to exchange packets with the remote network as if it were physically connected, and its link were secure and private. In this manner, outsiders cannot view link traffic nor inject traffic on the link. The method may include allowing virtual L2 and L3 device port configurations to be annotated with identifier of a VPN configuration object, stored in the shared database. VPN configurations may be assigned to specific underlying network nodes, or underlying network nodes may compete to grab a lock on a VPN configuration where acquisition of a lock on a VPN configuration signals that the lock owner is responsible for managing the corresponding VPN link. In the latter case, the failure of a node results in loss of the lock by that node and therefore teardown of the VPN link on that node if the node is still alive. Acquisition of the VPN link by another node is therefore possible. A VPN configuration may include a private port identifier. The private port identifies a virtual port on the device that should be linked to the remote network. The underlying network node to which the VPN is assigned locally creates a logical network interface and maps it to the private port identifier. It then launches a VPN management daemon (e.g. OpenVPN) inside a container and links the container to the newly created interface. Traffic emitted by the node via that interface (i.e. emitted by the virtual network from the private port) thus arrives at the VPN management daemon who in turn encrypts it and forwards it to the remote site. Where the VPN configuration specifies that the VPN management daemon inside the container should forward encrypted traffic to the remote site via the underlying network node's own networking, the VPN management daemon in the container must therefore act as a VPN client (because the underlying network node may not have a public IPv4 address). The VPN configuration therefore specifies the public IP address of the remote VPN management daemon to which the local daemon should connect. In another aspect, all the underlying network nodes may not have direct access to the internet and the encrypted VPN traffic must therefore re-enter the virtual network to be tunneled to a virtual device that has an uplink connected to the Internet (e.g. an L3 edge router with a BGP enabled port). In an embodiment, the VPN configuration specifies a public port, which identifies a virtual port on a virtual device that can forward packets (directly or indirectly) to the Internet. The VPN configuration also specifies whether the local VPN daemon should ace as a server on a specific IPv4 address and TCP (or UDP) port, or a client that connects to a remote IPv4 address and TCP or UDP port. The node to which the VPN is assigned creates a local logical network interface, maps it to the public virtual port, and connects it to the VPN management daemon container. The VPN daemon is configured to send its encrypted/tunneled traffic from that interface, and will receive encrypted traffic from the remote site from that interface.

In yet another aspect, the system provides DHCP capabilities on the virtual network and can configure hosts (physical or virtual) that have access to the virtual network. In this manner, no single DHCP server is needed, nor does one need to be simulated on a single L2 domain. He DHCP configuration may be abstracted from L2 domains and simply defined as a resource that can be associated with a virtual port. When a DHCP Discover or Request message arrives at a virtual port (i.e. arrives at an interface corresponding to a virtual device's exterior port), the system's network-simulating decision engine checks the port's configuration to see whether there is an associated DHCP configuration. If so, the decision engine uses the associated DHCP configuration to construct replies (DHCP Offers and Replies, respectively) to those messages and instructs the node to emit those packets from the interface on which the request arrived. Alternatively, the decision engine simulates the packet's traversal of the network as for any other network packet arriving at a virtual port. In this respect, DHCP is another protocol transported by UDP, which in turn is an L4 that runs on IP. This approach allows DHCP resources to be designed independently of network topology, and more specifically, independently of L2 domains. DHCP resources may therefore be shared across arbitrary sets of ports according to the user's needs. In embodiments, the system stores DHCP resources in the shared database.

In an embodiment, a DHCP resource is provided. The DHCP resource includes DHCP configurations defined by a set of options with corresponding values. The DHCP resource also includes a dynamic IP address pool, and potentially a set of static MAC addresses to IPv4 address assignments. The components of the DHCP resource may be bundled and associated with any virtual device exterior port. The system may utilized a DHCP resource in a method that includes storing the DHCP resource definitions in the shared database, storing the exterior virtual port to DHCP resource mapping in the shared database, using the decision engine to identify DHCP packets that arrive at a virtual port, and determining whether the virtual port is mapped to a DHCP resource. If the virtual port is not mapped to a DHCP resource, using the methods previously described to decide how the packet should be handled. If the virtual port is mapped to a DHCP resource, using the DHCP resource definition to construct the logical reply to the packet according to the DHCP protocol and according to the sender's MAC address. Where the sender is requesting an IPv4 address, the system further checks whether a static assignment exists for the sender's MAC address and returns that IPv4 address as the offered IP address. Where the sender is requesting an IPv4 address and the DHCP resource contains no static IPv4 address assignment, the system checks whether the resource defines a dynamically allocated IPv4 address pool. If so, and if there are unreserved addresses in the pool, one of the addresses is reserved on behalf of the client (identified by MAC address), and the DHCP reply message is constructed that should be emitted via the exterior port that received the request. IPv4 address reservations from a dynamically assignable pool defined in a DHCP resource may be stored in the shared database to prevent collisions or re-use. The reservation includes a lease that may be renewed by a client request. When a lease is renewed a lease expiration time may be updated by the decision engine to maintain the lease for a defined period of time.

In another embodiment, the system implements representational state transfer (also referred to as a REST API). The REST API may be used by the system and tenants of the system to inspect, monitor and modify the virtual network, including the virtual network topology. In embodiments, the REST API provides role based access control and is aware of the ownership of each part of the virtual topology. The REST API may also be aware of the roles and capabilities of one or more tenants. In one example, a tenant may create its own virtual switch and router, and manage all aspects using the REST API. In some cases, such as in IasS clouds, there may be a tenant, such as a service provider tenant, that has a pool of global IP addresses that it can lease to other tenants. In such systems, the service provider tenant can create an interior facing port and give another tenant the capability to link to that port as described above.

Figure 5:
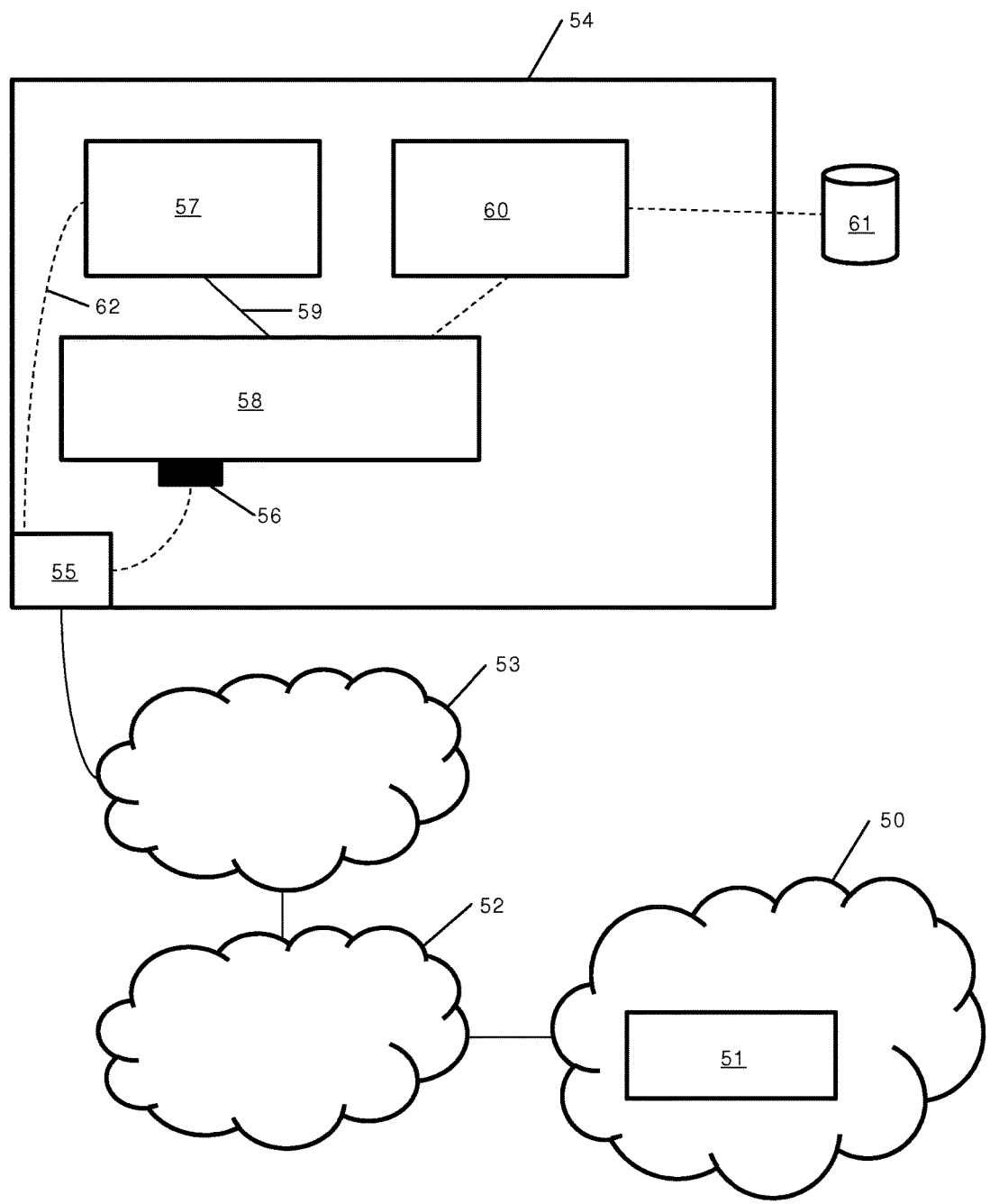
FIG. 5 illustrates a physical view of a system for VPN management.
Figure 13:
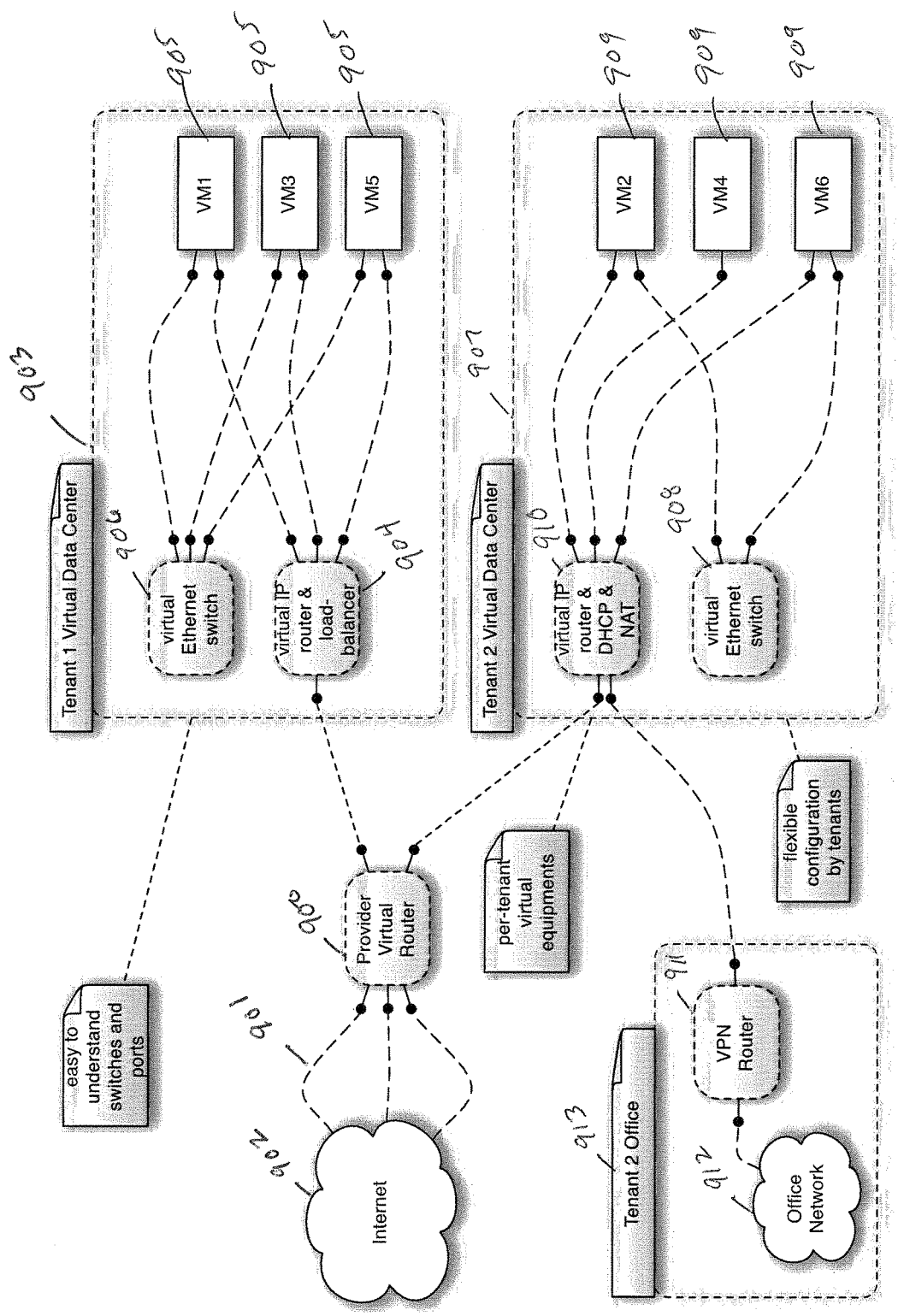
FIG. 13 illustrates an embodiment of a virtual network.
Figure 14:
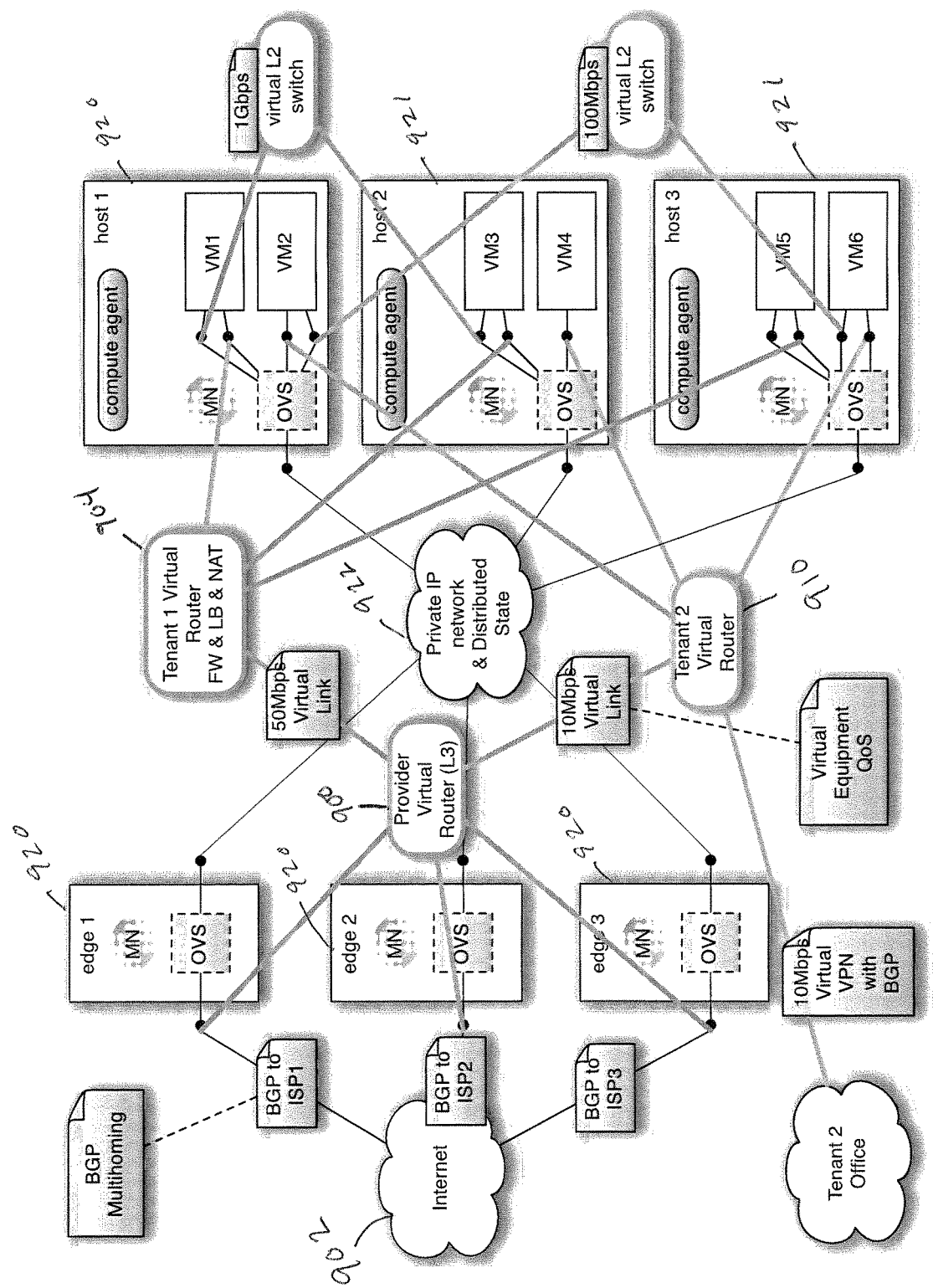
FIG. 14 illustrates the virtual network of FIG. 13 overlaid on a physical network.

For purposes of illustration, embodiments of systems configured to implement one or more of the presently disclosed methods are depicted in FIGS. 13 and 14. Referring to FIG. 5, a physical view of a system is illustrated that is configured for use with a VPN application. A remote site 50 having a VPN server 51 communicates over the Internet 52 to an underlying network 53. In an embodiment, the VPN server 51 may be an OpenVPN server. The underlying network may be a private IP network. A host 54 may be a node connected to the underlying network and includes a network interface 55. The network interface 55 is connected to a tunnel port 56. The tunnel port 56 may utilize GRE tunneling or other tunneling methods as previously discussed. The network interface 55 may also communicate with a VPN client 57 in a container through an encrypted tunnel 62. The VPN client may be an OpenVPN client. The VPN client 57 in the container communication with a flow programmable switch 58 through virtual network traffic 59. The flow controllable switch 58 also communicates with a decision engine 60 that communicates with a shared database 61. Applying one or more of the methods presently disclosed, the system provides a VPN management daemon using the host's network to reach the VPN server at the remote site.

Figure 6:
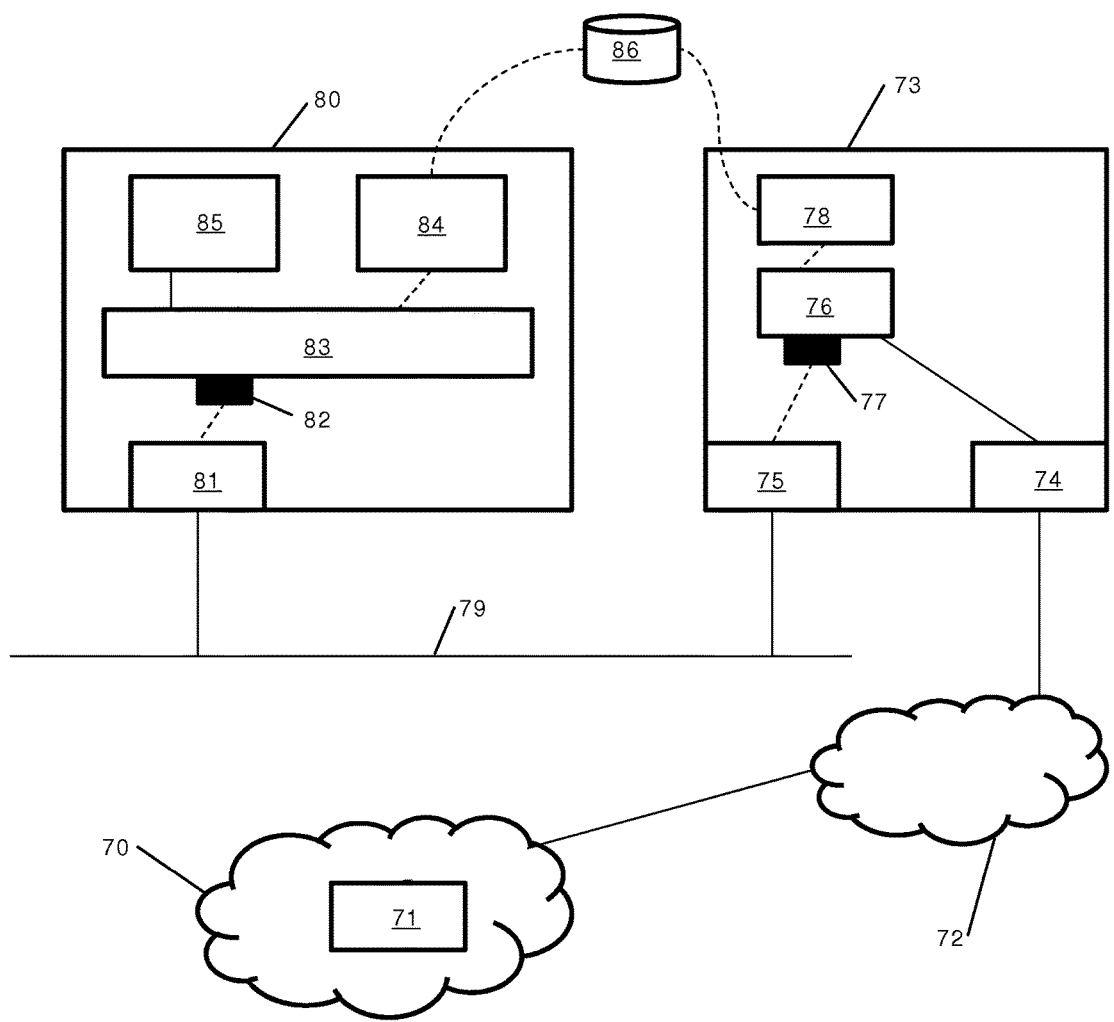
FIG. 6 illustrates a physical view of another system for VPN management.

Referring to FIG. 6, a physical view of another embodiment of a system is illustrated for use with a VPN application. A remote site 70 having a VPN server 71 communications over the Internet 72 to a network interface 74 of a first host 73. The first host 73 includes a decision engine 78 that communicates with a flow programmable switch 76. The flow programmable switch 76 communicates with a network interface 75 through a tunnel port 77. A network interface of the first host 73 is connected to an underlying network 79. The underlying network is also connected to a network interface 81 of a second host 80. In an embodiment, the underlying network 79 is a private network that is isolated from the public Internet. The second host 80 further includes a flow configurable switch 83 that communicates with the network interface 81 through a tunnel port 82. The flow programmable switch 83 also communicates with a decision engine 84 and a VPN client 85 in a container. The decision engine 84 also communicates with the shared database 86 such that the shared database provides distributed state information for the system. Applying one or more of the methods presently disclosed, the system provides a VPN management daemon in a cloud computing environment using the virtual network's uplink to reach the VPN server at the remote site.

In still other embodiments, systems and methods to facilitate packet routing using a virtual network overlaid on an underlying network are presently disclosed. In embodiments, the underlying network is a physical network, however, in other embodiments, the underlying network may be a virtual or logical network. For clarity, the underlying network may be described in terms of a physical network, however, one or more virtual networks may be layered upon another, each providing the underlying network for the next overlaid virtual network.

A system of the present disclosure may include a network interconnecting a plurality of nodes. The nodes of the network may correspond to physical components such as servers, routers, or other computing devices in communication with the network. Each device may support one or more nodes. In another embodiment, the nodes may represent logical or virtual devices. The network may be a private network maintained by a service provider, where the service provider sells, leases, or otherwise provides network capabilities to a plurality of tenants. The network may have one or more nodes, such as edge nodes, that provide connectivity to a public network. In one example, the network includes a plurality of Internet facing nodes providing multiple input/output communication pathways between the Internet and the network. The Internet facing nodes may be Internet connected routers. In another example, the network includes a plurality of nodes configured to host tenant virtual machines. The nodes hosting tenant virtual machines may be host servers or other devices with the necessary resources to operate one or more tenant virtual machines. In some implementations, a node may host multiple virtual machines from a single tenant. In another embodiment, a node may host multiple virtual machines owned by different tenants. In yet another embodiment, a node may operate both to host a tenant virtual machine and to provide Internet connectively to the network.

In various embodiments, a method is disclosed for routing a packet from a first node to a second node. The method includes receiving a packet at a first node of the network. The method further includes invoking a decision engine to simulate how the packet will traverse a virtual network. The simulation may include accessing a virtual routing table to determine a next hop for the packet, where the next hop is either an interior facing port (also referred to as a logical port) or an exterior facing port (also referred as a materialized port), and continuing to access subsequent virtual routing tables in series until the next hop is determined to be an exterior facing port on a second node of the network. After the decision engine has determined how to process the packet, the packet may be sent over the underlying network to the exterior facing port of the second node. In embodiments, the underlying network may be an Ethernet network, a private or public IP network, or other network providing connectivity between the plurality of nodes.

In one embodiment, each node of the network contains an edge connector. Each edge connector contains an instance of a flow configurable switch and decision engine running on the same physical host or node. In one embodiment, a flow configurable switch may comprise software such as Open vSwitch. The decision engine may simulate one or more virtual L2 switches and virtual L3 routers. An edge connector may have physical interfaces, virtual interfaces, or both. Virtual interfaces are interfaces such as, for example, tap interfaces or kernel level virtual interfaces. Physical interfaces are, for example, a physical network interface card (NIC).

A flow configurable switch is a software component that applies an action list to all packets that match a flow rule. Associated with an action list is a flow match that specifies what packets match the flow. In some embodiments, the flow match may be specified by a packet protocol header pattern. The flow match may be based on one or more portions of the packet data, including for example, the source and destination ports, source and destination addresses, MAC address. The flow match may also be based on combinations of packet data or subsets of packet data, such as a portion of the source or destination addresses. A flow rule may comprise at least a flow match and an action list, and may be referred to as a "flow." Two flows (one inbound, one outbound) form a connection. Generally, two flows, an inbound flow and an outbound flow, form a connection for communications between a client outside the network and a tenant's virtual machine or other provided service within the network. Each flow represented by one or more flow rules may be stored in a distributed state maintained in a shared database. In one embodiment, each flow is stored in a distributed state maintained on a node of the of the network accessible by all other nodes requiring access to the distributed state. The stored flows may be indexed by their flow match, or by other criteria associated with the flow rules.

In one embodiment, a flow table may be maintained that caches the routing decisions made for the first packet in one direction of a connection. The flow table is maintained inside the flow configurable switch. The network may have multiple possible access points to the external network, and connections need not use the same virtual route inbound as outbound. Allowing for different inbound and outbound routes may improve the fault tolerance of the system in the event of interruptions in certain portions of the network. Allowing for different inbound and outbound routes may also allow for improved utilization of network resources by balancing loads between different paths in the network.

The network may also contain forwarding elements that route and switch packets between the nodes of the network. The forwarding elements may be either L2 switches, L3 routers, or combinations of L2 switches and L3 routers. The forwarding elements may be either physical or virtual, and the network may include combinations of physical and virtual forwarding elements. A physical forwarding element is a hardware component, while a virtual forwarding element may be implemented in software. In one embodiment, a virtual forwarding element is implemented using tables. For example, the decision engine may be used to simulate the routing and switching of packets according to a virtual topology established for the network.

In the network, virtual routers may be connected to other virtual routers to construct a virtual network topology that may be illustrated by a virtual network graph. Each virtual router may have a plurality of virtual ports, where each virtual port is either an interior facing (logical) port or an exterior facing (materialized) port. For example, each virtual router may include a virtual routing table, and the interior facing ports may be identified by performing a lookup in the virtual routing table to determine the next hop for a packet being routed by the virtual router. Each lookup can lead to a peer interior facing port of another virtual router or an exterior facing port, allowing the decision engine to simulate the traversal of a virtual topology having multiple virtual routers. In one embodiment, an external facing port may correspond to a port in a flow configurable switch, such as a tunnel port. In some embodiments, an exterior facing port may correspond to the location of a node providing Internet connectivity. In another embodiment, an exterior facing port may correspond to the location of a virtual machine operating within the network. For both internal facing and external facing ports, the virtual port's static configuration in the shared configuration tree explicitly contains the port's type (i.e. interior or exterior facing) and, in the case of interior facing ports, the universally unique identifier ("port_uuid") of the other end of the virtual link (i.e. the peer interior facing port). Additionally, the virtual routers may have their own IP addresses. Additionally, each virtual router may support protocols such as border gateway protocol ("BGP") and/or internal gateway protocol ("IGP").

In another embodiment, the edge connectors may have tunnel ports that are not ports of the virtual routers. The tunnel port may be used to connect one edge connector to another edge connector across the network. For example, the flow configurable switch of one edge connector may be connected to the flow configurable switch of another edge connector by a tunnel port. In one embodiment, a packet may arrive at one edge connector destined for a virtual machine at another edge connector. When a packet is destined for an exterior facing port on another edge connector, it is sent to that edge connector via a tunnel. A table may be maintained in a distributed state that maps ports to edge connectors and a table that maps edge connectors to tunnels. Thus an edge connector may determine through which tunnel to send a packet based on a selected (non-local) port. In another embodiment, the mapping of exterior facing ports to edge connectors and of edge connectors to tunnels may be maintained on a separate node, and the edge connectors may communicate with the separate node to determine the appropriate tunnel for a packet.

In one embodiment, the edge connectors on each node have access to a distributed state, which may be stored in a shared database. The distributed state is maintained and shared by the edge connectors. The distributed state may contain, for example, the configuration tree and other data regarding the virtual and/or physical network topology. In one embodiment, a distributed state may be implemented using Zookeeper and memcache. In another embodiment, part of the distributed state is a configuration tree, but other structures such as hash tables and n-ary trees are contemplated. The configuration tree and other shared data may be accessed by the edge connectors as needed, such as by the decision engine.

The term "client" is used herein to indicate an external network client, such as a web browser, that is trying to reach a server hosted within the system, for example, to access the services of a virtual machine. The term "tenant" is used to indicate a customer of the service provider. A tenant may have one or more virtual machines or other services operating on physical machines within the system, and may want to dynamically establish load balancing or network address translation ("NAT") rules between these virtual machines and the clients.

Figure 7:
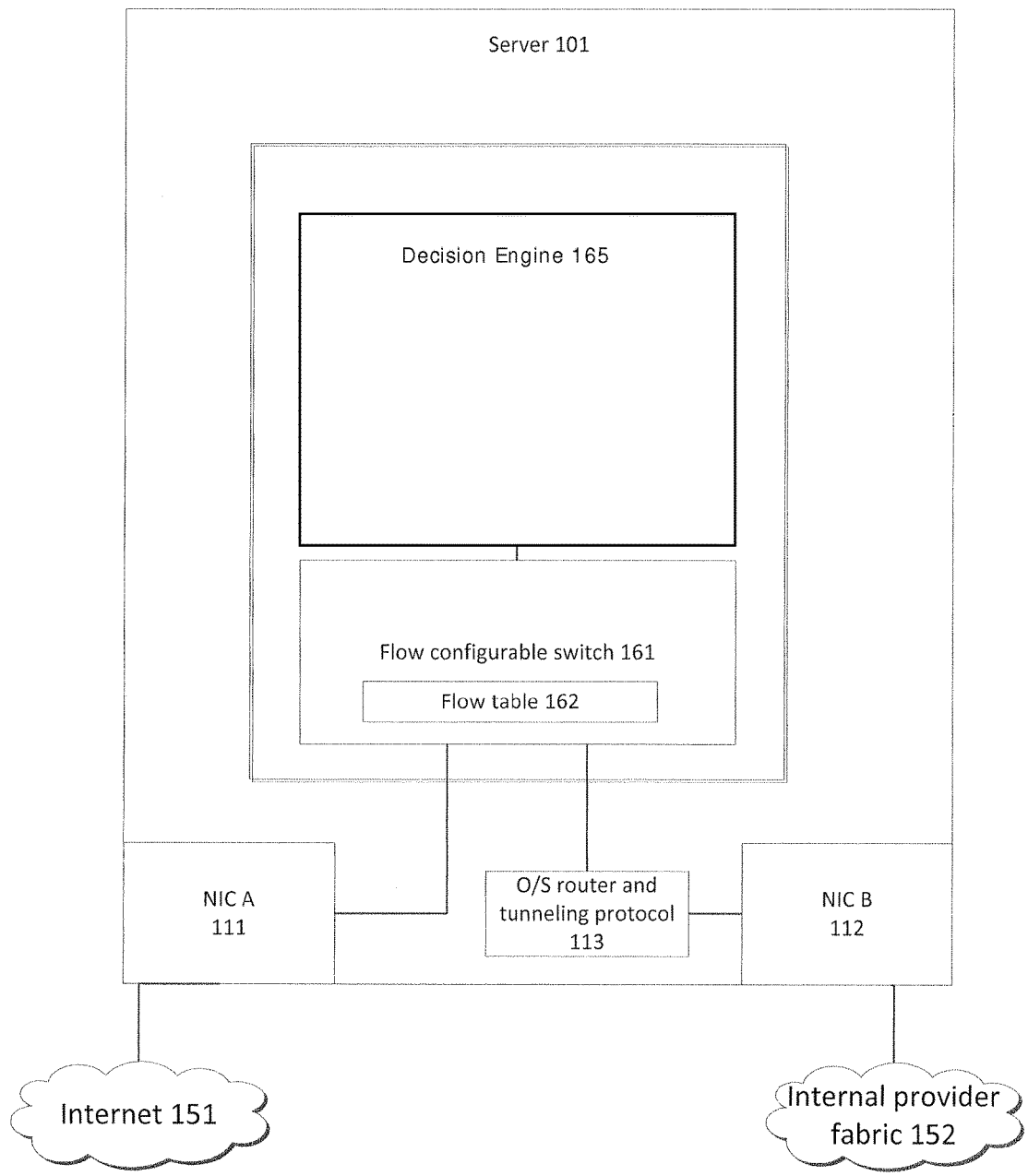
FIG. 7 illustrates an example of a server computer used by the system to route packets to and from a general network such as the internet to a service provider's IP fabric.

Referring now to FIG. 7, a server 101 is illustrated with two network interface cards, NIC A 111 and NIC B 112. For purposes of illustration some nodes may be designated as edge nodes facing internet clients, and providing internet connectivity to the network. Other nodes may be designated as host nodes configured to host tenant virtual machines or other services within the network. For purposes of illustration the edge nodes and host nodes may be shown with symmetric architectures, however, in various embodiments, a variety of architectures may be used for the various nodes in the system. Although illustrated in terms of internet facing edge nodes and virtual machine hosting nodes, the system may also contain intermediate nodes including, data storage devices and support servers desired to facilitate operation of the network. As shown in FIG. 7, NIC A 111 has a connection to the internet 151 and NIC B 112 has a connection to the internal provider fabric 152 (the underlying network). The internal provider fabric 152 may be a private IP network, or other network provides IP connectivity between the nodes.

The system includes a software component implementing many of the features of the virtual network overlaid on the physical network. To illustrate the operation of the software components, the actions following receipt of a packet are described for selected operations.

In one embodiment, a SYN packet is received to establish a TCP connection. The SYN packet is received from the Internet 151 on NIC A 111. Packets are received by the edge connector at the flow configurable switch 161 for switching. The flow configurable switch 161 attempts to identify a flow rule by matching data associated with the packet to the flow rules stored in the flow table 162. The matched data may include, for example, source and destination ports, network addresses, MAC addresses, or other data associated with the packet. The SYN packet is typically the first packet in a flow and therefore the flow configurable switch 161 does not find an entry corresponding to the first packet in the flow table 162. Upon not finding a corresponding entry in the flow table, the flow configurable switch 161 makes a function call to a decision engine 165 and communicates the packet to the decision engine. The packet may arrive on a port of the flow configurable switch, and the flow configurable switch may communicate the incoming port ID to the decision engine with the packet. Although the function of the flow programmable switch and decision engine are described separately for clarity, it will be apparent that the software components may be integrated as desired. Alternatively, each component may be partitioned or combined with other components provided that the functions of the component are maintained. In one embodiment, the decision engine communicates to the flow configurable switch 161 via the OpenFlow protocol and translates the incoming port ID of the flow configurable switch into a virtual port ID ("vport"). Alternatively, this mapping may be based on MAC address, or 802.1x credentials instead of incoming port ID. The rest of the packet's routing may be dependent upon its L3 information. The decision engine 165 has the logic to simulate the route of the packet through the virtual network topology. In one embodiment, only the first packet of a connection will cause a call to the decision engine, because, once the flow is created in the flow table 162 that flow may be applied to subsequent packets of the same flow.

Figure 8:
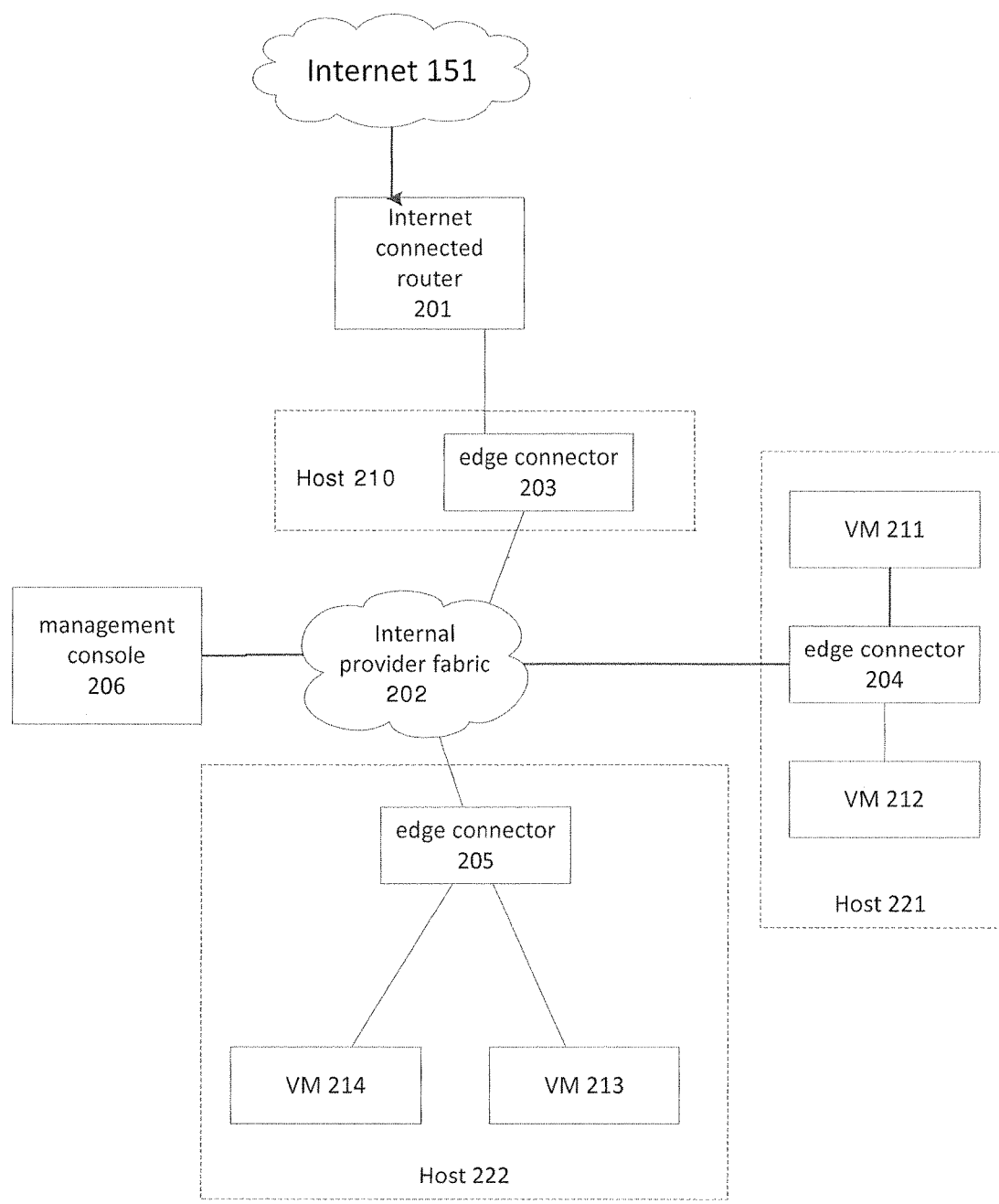
FIG. 8 illustrates an example physical network
Figure 9:
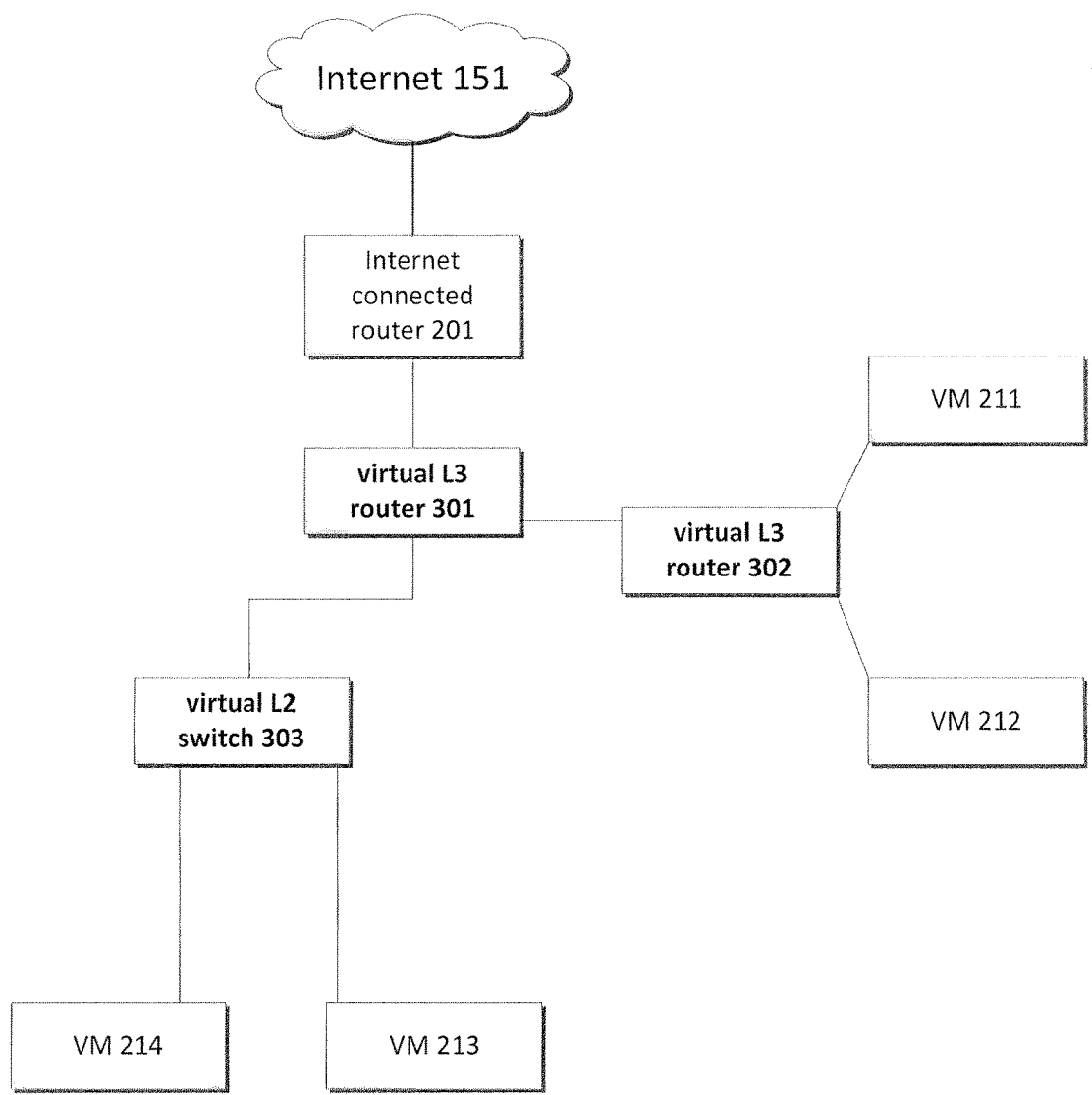
FIG. 9 illustrates an example virtual network that could be overlaid on the physical network of FIG. 8.

To create a flow rule associated with a new flow, in one embodiment the decision engine builds an action list indicating how to process and forward the packet and inserts it as a flow rule in the flow table. Subsequent packets that match the criteria for that flow have the action list applied, which may include routing the packet to a given port. If the packet were meant for another edge connector running on another server, it may be routed to the other edge connector via a tunnel port. Tunnel ports may connect edge connectors or nodes on the underlying network and are used to forward packets between edge connectors. Instead, when a packet is meant for a virtual port on another edge connector, it is sent to that edge connector through a tunnel. The tunnel protocol is, in one embodiment GRE+IP. This tunneling protocol allows one flow configurable switch 161 on a server 101 to communicate via the internal provider fabric 152 with another flow configurable switch (not pictured) on another server (not pictured). FIG. 8 illustrates the physical interconnection of a plurality of edge connectors 203, 204, 205 on a plurality of respective hosts 210, 221, 222 connected by the provider's internal L3 network fabric 202. For purposes of illustrate, virtual machines 211 and 212 operate on host 221, while virtual machines 213 and 214 operate on host 222. A management consol 206 may also be connected to the internal network fabric 202, which forms the underlying network. FIG. 9 illustrates the virtual topology that is overlaid on this physical network. The tunneling protocol allows the fabric to route the packets between flow configurable switches without modification to the hardware in the provider fabric 152. Because the actual packets travel over IP (L3) as opposed to Ethernet (L2), the network is scalable and may be not limited by distance limitations applicable to Ethernet communications. The end points of tunnels are ports in the flow configurable switches of the edge connectors, but tunnel ports are treated differently than exterior facing ports. The IP portion of the tunnel packet header allows the packet to get to the correct host, and then the GRE portion of the header serves to get the packet to the right tunnel port. Yet another key in the header serves to identify the destination exterior facing port, so that the receiving edge connector can route the packet to the correct local port.

Referring now to FIG. 8, a network comprising three edge connectors 203, 204, and 205 is illustrated, where each edge connector resides on a host. Continuing with the example from above, assume a packet was received at edge connector 203 on a physical network interface card (NIC) from the internet 151 via the internet connected router 201 and that the packet is destined for virtual machine 211. Recall that the packet is the first packet of a flow, so there is no flow rule corresponding to the packet in the flow table. Because there is no corresponding flow entry in the flow table, the decision engine is invoked. The decision engine determines a virtual port (vport) based on the port that the packet was received on by the flow configurable switch, and possibly by the MAC address, and 802.1x credentials. The vport in this instance is an external facing (materialized) port corresponding to a NIC and a port in the flow configurable switch. The decision engine uses the vport to determine which virtual router or virtual switch the port is connected to. As discussed above, a virtual router may be implemented by a table accessible to the decision engine and maintained in a distributed state. Once the decision engine determines what virtual router is connected to the exterior facing port, the decision engine selects a matching route by identifying the destination IP address in the corresponding virtual router table. In one embodiment, the decision engine may select one route from several routes, or several equal cost routes, using a load balancing algorithm.

In another embodiment, when the decision engine accesses a virtual router table to look up an IP address, pre-routing and post-routing processes may be applied. The pre-routing process may alter the packet, including the source and destination IP addresses and source and destination ports, to perform network address translation ("NAT"). The routing method may comprise extracting the source and destination IP addresses, looking up the IP addresses in a virtual routing table corresponding to a virtual router, selecting a destination (if more than one route is found), and forwarding the packet to the port corresponding to the route entry. The forwarding of the packet depends on whether the next hop of the matching route is an interior facing (logical) port or an exterior facing (materialized) port. Since virtual routers may be implemented as tables, routing between two virtual routers comprises a lookup in successive virtual router tables. In one embodiment, a global routing table is maintained for each virtual L3 router. The global routing table may be stored on in a distributed state in the shared database. Alternatively, the global routing table may be stored on a selected edge connector. In another embodiment, the global routing table is maintained on each edge connector and the edge connectors cooperate to maintain and update the global routing table on each other edge connector in the network.

Referring now to FIG. 9, a virtual topology is illustrated that may be overlaid on an underlying network, such as the physical network of FIG. 8. In one example, a packet may arrive on an exterior facing port associated with virtual L3 router 301 and its destination IP address is the IP address of VM 211. The decision engine may use the vport that the packet arrived on to determine what virtual router the vport is connected to, in this case virtual L3 router 301. In one embodiment, the virtual L3 router 301 may be a provider router, created and administered by the service provider operating the network. The decision engine may then utilize the IP address associated with the packet to determine an output port for the packet. If the output port is a local external facing port, then a flow is established in the flow configurable switch and the packet is routed to the local external facing port. If the external facing port is not local, the packet is routed out a tunnel port according to a vport to host table and a host to tunnel port table. If the port is an interior facing port of another router or switch, then the same lookup process is repeated until an exterior facing port is identified. To continue with FIG. 9, the lookup in the table of virtual router 301 may return an interior facing port corresponding to virtual router 302. After or in combination with the lookup, post-routing processes may be applied to the packet as desired. When the lookup returns an interior facing port corresponding to another virtual router, in this instance virtual L3 router 302, the decision engine may repeat the same process for virtual router 302. Virtual router 302 may be, for example, a virtual router created by a tenant to route traffic between the tenant's virtual machines, virtual machines 211 and 212. The tenant's virtual machines may be on the same host, or may be located on different hosts within the network. A tenant may lease network resources from the service provider to operate any number of virtual machines or other services within the capacity of the network subject to rules established by the service provider. The decision engine performs a simulation that may include any pre-routing associated with virtual L3 router 302, looking up the IP address in the virtual routing table to determine a next hop, and any post-routing. In this example, the next hop is virtual machine 211, which is hosted on a different edge connector than edge connector 203. The virtual router table for virtual router 302 provides a vport corresponding to VM 211 as configured by the tenant or the service provider. In one embodiment, the service provider may move tenant virtual machines between different nodes in the network to manage equipment utilization or to maintain operations during maintenance or repair of physical components in the network. The decision engine then looks up the physical location of the egress vport in a port location dictionary maintained in the distributed state. Because all packets forwarded by switches are L2 packets, there is space in the L2 packets for MAC addresses. Because tunnel ports are between two flow configurable switches, however, MAC addresses may not be necessary for certain applications. More specifically, in certain embodiments, there is no need to forward the actual MAC addresses because the egress edge connector can construct the MAC address based on its own local information, using ARP to determine the next hop MAC. Instead, the vport of the destination (in this case VM 211) is encoded into the space for the MAC address. The packet is then wrapped in GRE+IP with the IP address of the edge node as the destination. The packet is now ready to be routed via the L3 network. Referring to FIG. 7, an action list containing any pre- and post-routing and the routing destination may be installed in the flow table 162 to match all future packets of this flow and the packet may be sent out via the tunneling protocol and through the operating system router 113 and then to NIC B 112. The packet is, after it exits NIC B 112, routed over the internal provider fabric 152 as any other IP packet would be, with the destination IP address of edge connector 204.

When the packet is received by edge connector 204, it is received on a tunnel corresponding to a tunnel port of the flow configurable switch. Because the packet is received on a tunnel port, the edge connector may treat this packet differently than a packet coming in on an exterior facing port. The packet is again the first packet received on this flow and the edge connector 204 will invoke the decision engine. In one embodiment, the tunnel key encodes the destination vport id. The decision engine may use the vport id to determine a MAC address and the local port number of virtual machine 211. In some instances, the decision engine may initiate an ARP request to determine the MAC address of VM 211. Alternatively, the MAC address may be cached in an ARP table. An ARP table (IP to MAC) is maintained per port of a virtual router. The ARP table may be shared in distributed state stored in a shared database. After the decision engine has determined the vport of VM 211, the system may install a flow in the flow table to route future packets of this flow. The packet may then be routed to the port of the flow configurable switch corresponding to VM 211. Although VM 211 is a local virtual machine running on host 221, which also hosts edge connector 205, the decision engine may still use the destination IP address to find the destination MAC address. In this manner, the system abstracts whether the VM is local or a standard port to another router or switch further proving the flexibility of the system.

Once the flows have been established, subsequent inbound packets on the same connection will match the flows in the flow tables of edge connectors 203 and 204 and will be modified and forwarded by the flow configurable switches on those machines without invoking a decision engine. This process establishes the inbound flow of a connection through the system to the desired destination.

When VM 211 responds on the same connection, the first packet it sends will trigger the system to establish a corresponding flow in the opposition direction. When a new flow is established, the decision engine may access the distributed state to determine if a flow was previously established in the opposite direction. This distributed state facilitates implementation of other processes, such as NAT and also enables the system to cleanup terminated connections as described further below. In other embodiments, virtual machines hosted on different physical components may be connected to the same virtual router.

Figure 10:
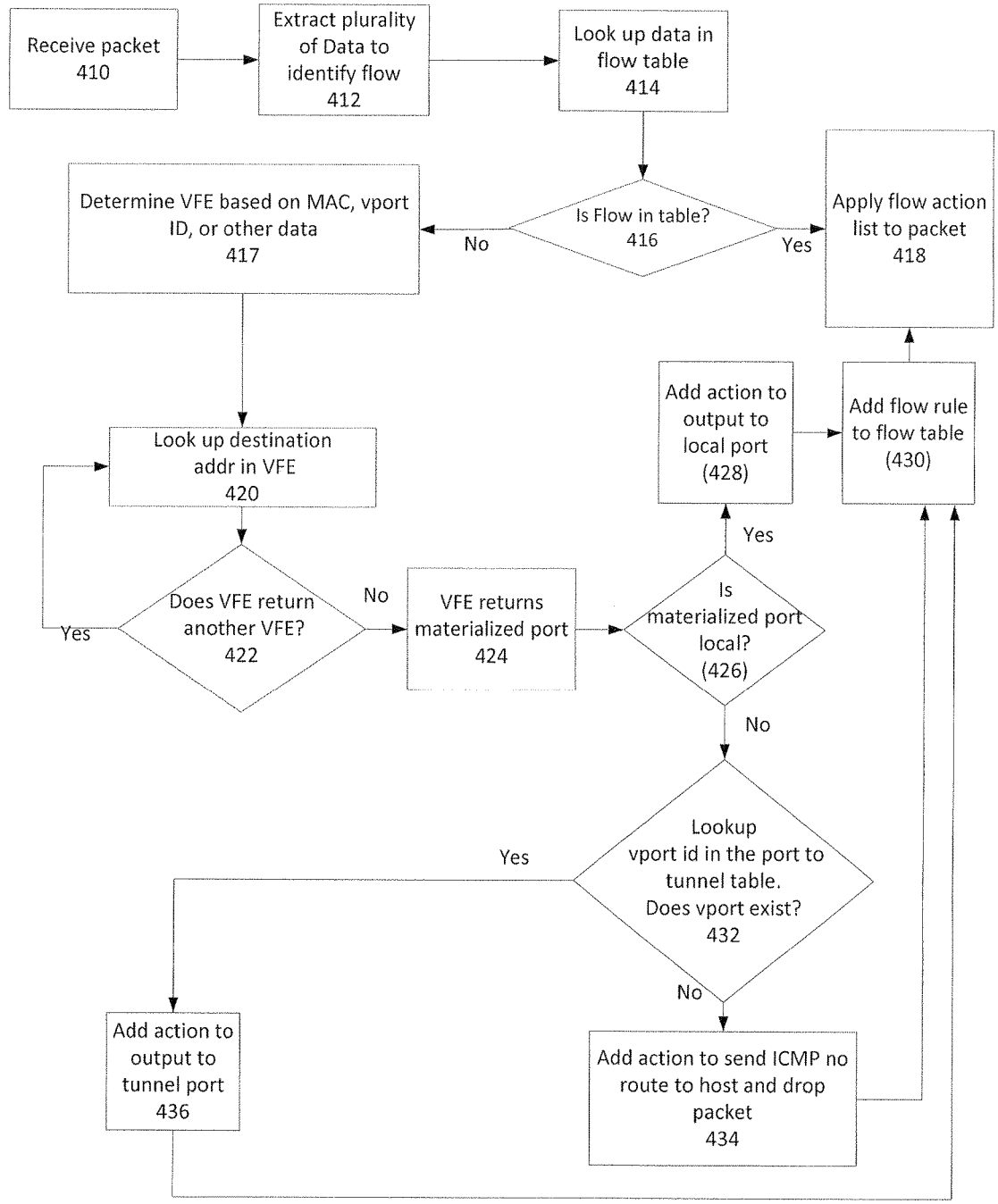
FIG. 10 illustrates a process running on an edge connector to route packets in a virtual topology comprised of virtual routers.

Referring now to FIG. 10, a high level overview of a process running on an edge connector performing an embodiment of method described above is illustrated. In an embodiment, an edge connector runs on a physical machine with at least one CPU that receives packets from an external network, such as the Internet, where the packets are addressed to an IP address associated with a tenant of the system. The tenant IP addresses may be assigned to tenant virtual machines running on one or more hosts within the system. In one embodiment, the IP address associated with a tenant virtual machine may remain constant even though the tenant or service provider relocates the virtual machine to a different host within the system. In an embodiment, the system allows multiple tenants to share one service provider's uplink, by allowing multiple IP addresses on one uplink to be routed to different edge connectors and different tenant virtual machines. When the edge connector receives a packet at step 410, it extracts a plurality of data at step 412, including but not limited to, source and destination addresses and source and destination ports. After extracting the data, the edge connector looks up the plurality of data in a flow table (step 414) and determines if the flow has already been established (step 416). An example of a flow would be one direction of a TCP connection, with an inbound and outbound flow combining to form a single TCP connection. If the flow already exists, the flow action list is applied to the packet and the packet is forwarded to the port of the flow configurable switch indicated by the flow action list in step 418.

If the flow does not exist, this is the first packet in the flow received by the node, and the edge connector must determine in step 417 what virtual port the packet arrived on, based on, for example, MAC address, source and destination addresses, or source and destination ports. Once the edge connector determines the virtual port ID, the edge connector can determine what virtual forwarding element that port is connected to. In the embodiment of FIG. 10, the virtual forwarding element is a virtual router, but other virtual forwarding elements, such as virtual switches, may be utilized as necessary in the system as discussed below. Once the edge connector determines the VFE, the edge connector performs another lookup in step 420. The lookup is performed by looking up the destination IP address in a series of virtual forwarding elements. The virtual forwarding elements may comprise any combination of virtual routers and virtual switches including virtual routing tables to determine the appropriate path for the packet being forwarded. In the embodiment shown, in step 420, the decision engine determines the destination of the packet in a first virtual forwarding element. The first virtual forwarding element may be a virtual router, in which case the destination returned may be either an exterior facing port or an interior facing port. As noted above, an interior facing port is paired to another interior facing port of a second virtual router, and the second virtual router has another routing table. If an interior facing port is returned, the decision engine looks up the destination address in the routing table of the second virtual router in step 420 and continues until an exterior facing port is returned. In one embodiment, each tenant may have a single virtual router configured to route all packets handled by that tenant. In other embodiments, some tenants may have a plurality of virtual routers, virtual switches or other virtual forwarding elements defining the tenant's portion of the virtual network topology. The decision engine also builds a series of actions to be performed on the packet from each virtual routing table. Each routing step may also have pre-routing or post-routing processes that are added to the action list and incorporated into the flow rule to be applied to the packets matching the flow.

Once an exterior facing port has been returned (step 424), the edge connector determines if the exterior facing port is local (step 426). If the port is local, an action is added to the action list (step 430) to route the packet to the local exterior facing port. In various embodiments, the local exterior facing port may be a network interface card or virtual machine. The flow rule is then added to the flow table (step 430) and applied to the packet (step 418). If the exterior facing port is not local, then the port is on a different edge connector. In one embodiment, edge connectors may be connected by tunnel ports, such as GRE_IP tunnel ports. In step 432, the edge connector accesses a virtual port to tunnel table to attempt to map the exterior facing port to a tunnel port. If there is no corresponding entry in the virtual port to tunnel table mapping, an action to drop the packet and send an ICMP packet is added to the action list (step 434), the flow rule is added to the flow table (step 430), and the flow rule is applied to the packet (step 418).

If the exterior facing port is in the exterior facing port to tunnel table, then an action to output the packet to that tunnel is added to the action list (step 436), the flow added to the flow table (step 430), and the action list applied to the packet (step 418).

In one embodiment, the system installs the action list and flow rule in the flow configurable switch datapath, and the flow configurable switch applies the action list to any subsequent packets that match the flow rule, as shown in step 416. As described above, part of the action list includes which port of the flow configurable switch the packet is to be sent on. The edge connector looks up the port in a port to host IP table, and sends the packet to the IP address. It then stores the action list in a flow table. All subsequent packets that have a matching plurality of data will have the same set of actions applied to them, resulting in them being routed to the same IP address.

During the process of identifying the destination address in the virtual routers, the flow may be unrouteable, black holed, or match a reject route, at which point the packet is dropped, or ICMP packets are returned. In this embodiment, a flow may be created to drop all packets that match the flow's rule. In this manner, the system may be configured to handle unrouteable packets or selectively screen undesired data according to rules established by the service provider or tenant.

In yet another embodiment, an edge connector hosting tenant VMs may have multiple IP addresses and multiple NICs connected to the internal fabric network. In such a case, the internet facing edge connectors can select one of multiple paths to the VM hosting edge connector. Further, a VM hosting edge connector with multiple IP addresses may have a unique ID to identify the edge connector, and the decision engine routing flows may select one of the IP addresses of the VM hosting edge connector, for example using a load balancing algorithm or randomly.

Another embodiment of the system may use identifiers for the edge nodes other than IP addresses. For instance, the network fabric may be circuit based, such as multiprotocol label switching ("MPLS") or another custom OpenFlow controller with dedicated circuits between edge connectors. In this embodiment, the circuits may replace the GRE tunnels between flow configurable switches on edge nodes.

In another embodiment, the system provides for pre-routing and post-routing stages before and after the routing stage. Pre-routing and post-routing may be utilized to implement network address translation (NAT), load balancing, or other L3/L4 features. In one embodiment, the pre-routing stage may change the flow's destination (as, for example, in network address translation) and the outbound routing may change the flow's source (again, as an example, network address translation). To coordinate the mappings performed by the forward and reverse flows composing a single connection, such as in a TCP connection, connection translations may be stored in the distributed state with a large timeout. These translations may also be cleaned up proactively when connection tracking detects a cleanly closed connection.

In one embodiment of the present system, NAT is implemented using pre-routing and post-routing transformations. On flow setup, the NAT pre-routing stage determines if there a flow was previously established in the opposite direction (inbound vs. outbound) in the distributed state and, if so, the previously created map is reversed for the new flow. Because the flow rules are stored in the distributed state system accessible by all nodes, upon creation of a new flow on a different node, it is possible to determine whether an opposite direction flow was previously created. If the opposite direction flow is not in the distributed state, the decision engine creates a new translation and stores its translation map in the distributed state associated with the new flow. For the inbound flow, or alternatively the first flow established, the address translation may be applied to the destination address before the routing step and the routing step may route based on the translated IP address. On the outbound flow, or alternatively the second flow in the connection, NAT may be performed after the routing, to translate the source address to be the external, non-private IP address. The translation information may be stored in the distributed state associated with the flow rule prior to forwarding the initial packet of the flow such that the translation information is accessible when the initial packet of the reverse flow is received at the corresponding edge connector.

In another embodiment, destination network address translation (DNAT) may be used to translate from a publicly available IP address to a private network address to expose services hosted on a private network to the general internet. In some embodiments, a demilitarized zone (DMZ) may be provided between the general internet and the private network. In a DNAT process, the destination address may be translated during a pre-routing stage for the incoming flow, and in the corresponding outgoing flow, the source address may be translated during a post-routing stage. In one implementation, the destination address may be one of several possible servers, and the destination server may be selected by a load-balancing algorithm, such as a random algorithm or a round-robin algorithm.

In source network address translation (SNAT) multiple clients on the private LAN may share the same public IP address. A source address associated with outbound connections, such as connections from tenant virtual machines to an external network, may be translated to the same IP address in the outbound flow. In the corresponding inbound flow, a packet destination IP address may be translated to the corresponding private IP address based on, for example, port number and source IP address.

In another embodiment, the system may be configured to provide ARP spoofing for private local area networks. The system may permit single network hosts such as a virtual machine guest to be connected to a virtual router port without consuming gateway/broadcast addresses by impersonating other single hosts when the host ARPs for them. In a traditional Ethernet-based design, this would consume at least a /30 address range, including the guest's address, the gateway address, and the broadcast address, plus one unused address.

As one method of reducing the number of IP addresses consumed, each port of the router may be configured with a MAC address and network prefix (nw_prefix) and a flag indicating if there is a single host connected to the port. The gateway address used may be the first address in the nw_prefix range. If the single-host flag is unset, the router may handle traffic to and from the port according to its standard operating rules. If the single-host flag is set, the address portion of the nw_prefix specifies the address of that port's single network host. The router's downstream ports may be configured such that they comprise non-overlapping nw_prefixes with the single-host flag unset and ports with the single-host flag set, which may share identical address ranges specified by their nw_prefixes. In many embodiments, the address ranges used by the single-host and non-single-host ports will not overlap.

If an IP packet is sent between ports with the single-host flag set, the router may forward the IP packet without checking or decrementing the time to live ("TTL"), emulating an L2 switch. If an ARP request is received from a port with the single-host flag set for the address associated with another single-host port, the router responds to the ARP, impersonating the target. The result is that a single-host wanting to send traffic to a host outside what it considers its local segment will ARP for the gateway address, and the normal behavior of the router will return its port's MAC and the host will then send its IP packets. A single-host wanting to send traffic to a host it considers part of its local segment will ARP for that host directly. The router will respond to that ARP if it has a single-host port for that address, in which case the host will then send its IP packets. Behavior of hosts not on a single-host-flagged ports may be unchanged.

In another embodiment of the system, stateful connection tracking may be used to track the life cycle of connections, such that data associated with those connections may be cleaned up upon certain events, such as termination of the connection. The data to be cleaned up may include various connection state data, including data stored in the distributed state, such as stateful NAT and LB mappings, when the connection is cleanly shutdown. If a connection is not shutdown cleanly, for example if one side or the other crashes or is disconnected, then the connection state may be expired after a large configurable timeout. Connections may be TCP connections, and are composed of two flows, a forward flow, and a return flow. In the case of TCP, the system may simulate the TCP connection state machine in order to determine the connection state.

In yet another embodiment, the system provides for the return flow of a connection to be handled by a different node than the forward flow of the connection. A connection of this type may be referred to a split flow, characterized by the forward and reverse flow being handled by different decision engine. In one embodiment, the system supports split flows by having the decision engine seeing the forward and reverse flows communicate the closing of their respective sides. For example, the decision engine handling the FIN of the forward flow may notify the decision engine handling the return flow to install an action matching the FIN's ACK, or vice versa. The decision engines cooperate such that they may identify when both sides of a connection have been closed and are able to clean up the data associated with the closed connection. This communication among the decision engines may occur through the shared state in the distributed state system. Additionally, the distributed state system may identify certain conditions, such as the closing of both sides of a connection, and may communicate notifications to the decision engine handling each of the flows of the communication.

In another embodiment, when an edge node or edge connector handles the setup of a flow, either forward or reverse, which is part of a connection that should be tracked (based on whether it is a TCP connection, and whether stateful tracking is needed, e.g. if the connection is being NATed), the edge connector will add an action which checks for the TCP FIN bit and outputs the FIN packet. Upon receiving a FIN packet, the decision engine handling the reverse flow may install an action checking for the ACK of the FIN. When the ACK of the FIN is seen by the system, the connection is considered half-open, such that no data but only ACKs are expected. If data is received by a half-open connection, the system may generate an error indicating an unexpected condition was experienced by the system.

When a decision engine receives a new flow, it will install a rule which checks for the TCP FIN and RST flags. If the system receives an RST packet, it modifies the flow rule for the connection to have a short timeout, as the connection is going to be terminated once the peer receives the RST packet. If the system receives a FIN packet, it inserts into the action list of the return flow an action matching the acknowledged sequence number being the FIN packet's sequence number. If the system gets a packet acknowledging a FIN, it marks that side of the connection as closed. If both sides are closed, it modifies the flow rule for the connection to have a short timeout. In some instances, the FIN's ACK may be dropped, in which case the closing side will retransmit the FIN packet with the same sequence number. When the flow rules expire, the system identifies that the connection is closed and may cleanup additional state data such as NAT tracking.

Figure 12:
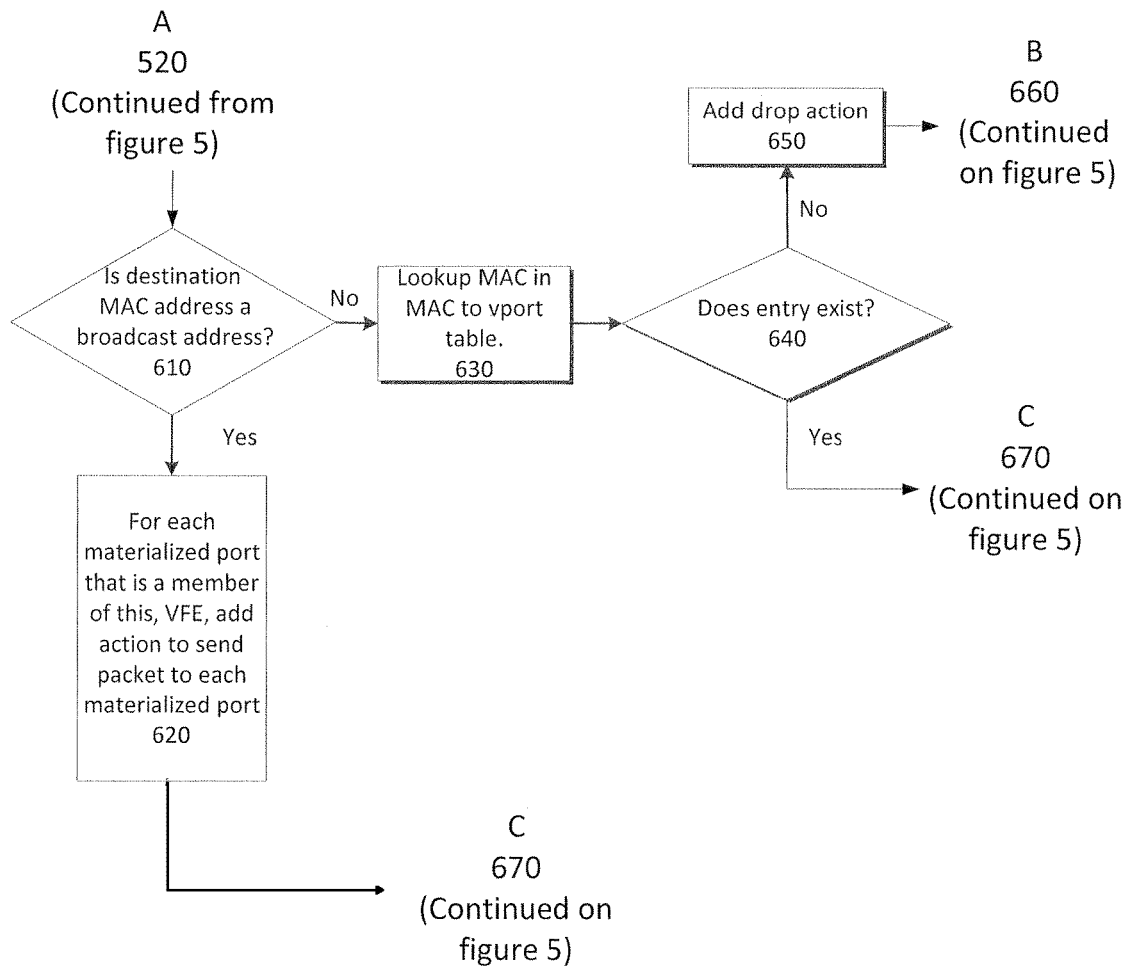
FIG. 12 is a continuation of the process of FIG. 11.

In another embodiment of the system and method presently disclosed, a virtual switch is provided as an additional virtual forwarding element. The system may transmit L2 packets between the edge connectors' ports that are part of each virtual L2 switch. In this manner the system may simulate the operation of a physical L2 switch transmitting packets between NICs connected to the physic switch. The system may also transmit packet L3 packets as described above using virtual routers. When setting up a flow, the incoming vport UUID is identified from the mapping of an ingress port or MAC address. Based on this vport UUID, the virtual device to which the vport belongs is determined. Based on the type of virtual device (switch or router), the packet is either routed (as described above) or is switched. That is, if the packet is an L3 packet, it is handled in accordance with the virtual router process described above. Alternatively, the packet is an L2 packet and is processed by a virtual switch, as illustrated in FIGS. 5 and 6. The process illustrated in FIGS. 5 and 6 is substantially similar to the process illustrated in FIG. 10. After the VFE has been determined in step 417, the edge connector determines if the VFE is a virtual router or a virtual switch. If the VFE is a virtual router, processing continues as described with respect to FIG. 10. If the VFE is a virtual switch, processing continues at point A (520), connected to point A (520) in FIG. 12. As illustrated in FIG. 12, if the VFE is a virtual switch, then the edge connector determines if the destination MAC address is a broadcast address or a unicast MAC address (step 610). If the MAC address is a broadcast address, then the packet is sent to each port connected to the virtual switch (step 620). On a per packet basis, this step may be identical to the process of FIG. 10 starting with step 426. For each exterior facing port that is a member of the VFE, the packet is either sent to the local vport or the tunnel port corresponding to that exterior facing port.

If the packet is not a broadcast packet (e.g. a unicast packet), then the destination MAC is determined, for example, by looking up the destination MAC in a MAC to vport table (step 630). If there is not a corresponding entry (tested in step 640), then a drop action is added to the action list (step 650). Processing then continues at point B on FIG. 11, where the rule is added to the flow table (430) and the action applied to the packet (418).

Figure 11:
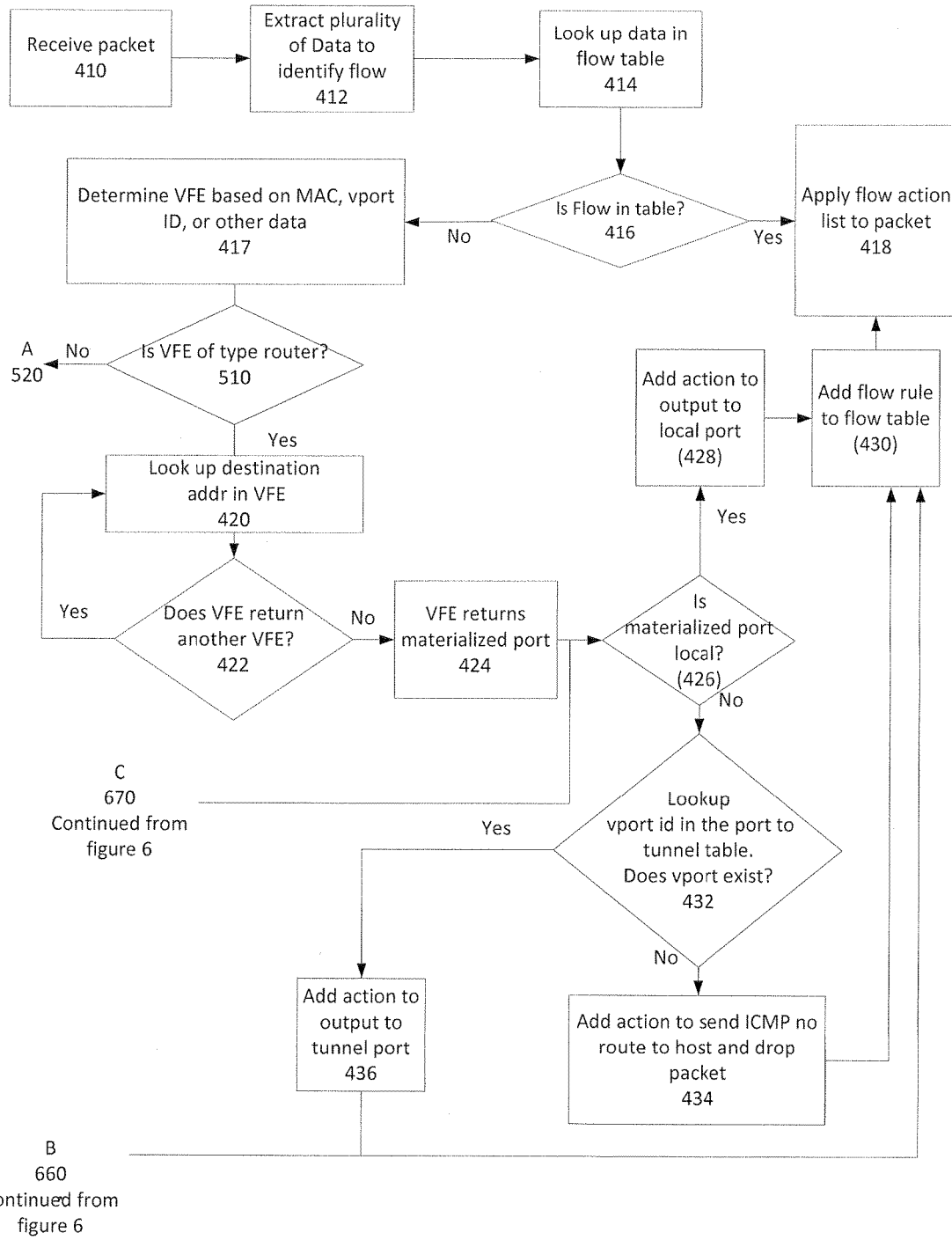
FIG. 11 illustrates a process running on an edge connector to switch and route packets in a virtual topology comprised of virtual routers and virtual switches

If there is a corresponding vport in the MAC to vport table of step 640, then processing continues at point C on FIG. 11, processing continues at step 426, as previously described.

Referring now to FIGS. 7 and 8, another embodiment of the system and method presently disclosed is illustrated. As shown in FIG. 13, a virtual network topology includes a provider virtual router 900 having multiple connections 901 to an external network, such as the general Internet 902. In this configuration the virtual network is provided with multiple communication paths to the external network allowing for flexibility and redundancy in the system. The provider virtual router 900 may have a plurality of exterior facing ports corresponding to a plurality of edge nodes, where an edge node is a physical component providing access to the external network. In one embodiment, an edge node may be an Internet facing router or server. The virtual network topology may also comprise a plurality of tenant virtual routers. In one configuration, each tenant virtual router may be associated with a tenant virtual data center. As shown in FIG. 13, a first tenant virtual data center 903 may includes a first tenant virtual router 904 in communication with a plurality of first tenant virtual machines 905. The first tenant virtual machines 905 may also communicate with a tenant virtual switch 906, which may be a virtual Ethernet switch as illustrated. The first tenant virtual machines 905 may reside on one, or more than one servers or host nodes in the network.

As also shown in FIG. 13, the virtual network topology may have a second tenant virtual data center 907, including a second tenant virtual router 910 in communication with the provider virtual router 900 and a plurality of second tenant virtual machines 909. The plurality of second tenant virtual machines 909 may also communicate with a second tenant virtual switch 908, which may be a virtual Ethernet switch as illustrated.

The virtual routers may also perform additional functions such as load balancing, DHCP, and/or network address translation as desired by each tenant. Although only one virtual router is illustrated for each tenant, in other embodiments, a tenant may employ a plurality of virtual routers creating a tenant specific virtual network topology. A tenant specific virtual network topology may provide for organization of tenant virtual machines in desired arrangements or provide for isolation between virtual machines controlled by the same tenant, such as where a tenant is utilizing the network to host multiple discrete functions or business processes.

In another embodiment, a tenant virtual router may provide secure access to a remote tenant office or other location. As illustrated second tenant virtual router 910 provides for a connection to second tenant VPN router 911 and second tenant office network 912 at second tenant office 913. In this manner, each tenant may define the configuration of its virtual data center. A service provider utilizing the presently disclosed system and method may therefore provide many tenant customizable solutions on a physical network.

Referring now to FIG. 14, the virtual network topology illustrated in FIG. 13 is shown overlaid on a physical network. The physical network may comprise plurality of edge nodes 920 configured to access an external network, such as the Internet 902. The physical network may also include a plurality of host nodes 921 configured to host virtual machines. The network 922 may interconnect the plurality of edge nodes 920 and the plurality of host nodes 921 and be adapted to transport data packets throughout the system. In one embodiment, the network may be a private IP network. The edge nodes 920 and the host nodes 921 may have symmetric architectures. In one embodiment, the edge nodes 920 and host nodes 921 are general purpose servers configured to operate in a cloud computing system. In another embodiment, the edge nodes 920 are dedicated Internet facing routers. In yet another embodiment, a server or other computing device may function both as an edge node and a host node in the same network. The system also includes a distributed state system in communication with each of the edge nodes and each of the host nodes through the network. The distributed state system may store data associated with the virtual network topology and may be stored in a shared database. The system may include a software component operating on each of the nodes and implementing the virtual network topology including the provider virtual router and each of the tenant virtual routers. As new routes are configured, the software component operating on each of the nodes may communication with the distributed state system such that the distributed state maintains a comprehensive mapping of the virtual network topology and flow rules for the system. In other examples, the distributed state system may be subdivided such that multiple distributed states are maintained for selected portions of the virtual network.

As illustrated in FIG. 14, the virtual network topology is overlaid on the physical network. The provider virtual router may have a exterior facing port associated with each of the edge nodes 920. The exterior facing ports of the provider virtual router 900 may map to one or more access points for internet service providers and provide multiple connections between the system and an external network, such as the Internet. The provider virtual router 900 may also have interior ports defining virtual links to corresponding peer interior facing ports of tenant virtual routers. As illustrated, the throughput of each virtual link in the system may be selected. For example, the service provider may provide a 50 Mbps virtual link to the first tenant virtual router 904, but provide a 10 Mbps virtual link to the second tenant virtual router 910. As the virtual links are configurable, if the second tenant wishes to purchase a greater throughput for its virtual data center, the service provide may modify the available throughput without modifying hardware.

In the embodiment illustrated, each host node 920 is hosting one virtual machine associated with the first tenant and one virtual machine associated with the second tenant. Using the virtual network topology, the service provider may reallocate tenant virtual machines among available host nodes without reconfiguration the physical network hardware. The virtual network topology stored in the distributed state system allows the system to be dynamically reconfigured.

In another embodiment, each of the plurality of tenant virtual routers may be configured to expose at least one public IP address and may be configured to access an external network through one or more of the plurality of edge nodes. By enabling each tenant virtual data center to access the external network through a plurality of edge nodes, the failure of a single edge nodes is less likely to interrupt availability of the tenant's services operating in the network.

As used herein, the terms "cache," "caching" or other variations refer to all forms of temporary data storage regardless of whether the data is stored in memory explicitly designated as a cache.

While certain embodiments have been described, it must be understood that various changes may be made and equivalents may be substituted without departing from the sprit or scope. In addition, many modifications may be made to adapt a particular situation or material to the teachings of the disclosure without departing from its spirit or scope.

What is claimed is:

1. A computing method comprising:
    receiving a network packet and a plurality of subsequent network packets into a computing network, wherein the computing network includes:
    a physical computing network including a plurality of interconnected computing nodes, each node having a plurality of network interfaces;
    a virtual network including a plurality of virtual devices implemented on one or more of the plurality of interconnected computing nodes of the physical network, each virtual device having one or more ports, with each port being either an exterior facing point associated with one of the plurality of network interfaces, or an interior facing port associated with an interior facing port of another virtual device;
    a shared database stored on at least one of the plurality of interconnected nodes and accessible from each of the plurality of interconnected computing nodes,
    the shared database containing a virtual network topology and a plurality of flow rules, wherein the virtual network topology includes at least a mapping of each exterior facing port of the plurality of virtual devices with an associated network interface of one of the plurality of nodes, a mapping that associates each interior facing port of the plurality of virtual devices with an interior facing port of another of the plurality of virtual devices, and
    a decision engine operable on one or more of the plurality of interconnected computing nodes of the physical network,
    wherein the method further comprises
        determining how the network packet should be processed based on a simulation by the decision engine of a traversal of the virtual network topology including the plurality of virtual devices,
        wherein the simulation includes
            creating a packet protocol header pattern by identifying each field of the packet header that is read during the traversal of the virtual network topology, wherein the packet protocol header pattern includes a wildcard for any field of the packet header that was not read during the simulation by the decision engine;
            determining a plurality of actions for modifying the packet header based on a configuration of each virtual device traversed by the packet during the simulation; and
            communicating the packet protocol header pattern and the determined plurality of actions to the shared database, storing the packet protocol header pattern and the determined plurality of actions as a flow rule in the shared database; and
        upon receiving a subsequent packet, selecting a flow rule from the shared database by matching a header of the subsequent packet with the stored packet protocol header pattern, and then modifying the subsequent packet based on the determined plurality of actions of the flow rule, such that the modified subsequent packet header is configured as the subsequent packet would be emitted at the egress exterior facing port based on all the actions applied through the traversal of the virtual network topology;
    determining that the packet should be emitted from a second network interface of a second node of the underlying network;
    forwarding the packet from a first of the plurality of computing nodes to a second of the plurality of computing nodes of the physical network across the physical network as a payload of a tunneling protocol packet having a tunnel key, wherein the tunnel key encodes a globally unique identifier of one of the plurality of network interfaces of the second of the plurality of computing nodes of the physical network through which the packet will be emitted; and
    emitting the packet from the network interface of the second of the plurality of computing nodes without invoking the decision engine on the second of the plurality of computing nodes of the physical network.

2. The computing method of claim 1 further comprising:
    determining that the packet should be emitted from a set of network interfaces corresponding to an interface set identifier, wherein at least a portion of the network interfaces are located on a second of the plurality of computing nodes of the physical network, and
    delivering the packet to each network interface in the set of network interfaces that are local to a first of the plurality of computing nodes, and forwarding the packet from the first node to the second of the plurality of computing nodes as the payload of the tunneling protocol packet using the tunnel key that encodes the interface set identifier.

3. The computing method of claim 1, wherein the physical network supports multicasting, the method further comprising:
    mapping each interface set identifier to a multicast address,
    maintaining, for each node of the physical network, a multicast subscription for each of the interface set identifiers to which at least one network interface of the node belongs, and
    multicasting the packet as the payload of the tunneling protocol packet to at least the second node, and
    for each node, emitting the packet from any network interfaces corresponding to the interface set that are local to that node.

4. The computing method of claim 1, wherein the physical network does not support multicasting, the method further comprising:
    determining a set of physical network nodes that have local network interfaces that belong to the set of network interfaces,
    forwarding the packet from the first node to each node in the set of underlying network nodes, and
    for each node, emitting the packet from any network interfaces corresponding to the interface set that are local to that node.

5. The method of claim 1, wherein the determined plurality of actions are stored as an aggregate modification to be applied to the subsequent packet header.

6. The method of claim 1, wherein the simulation further includes:
accumulating a set of virtual device identifiers, wherein each virtual device identifier corresponds to one of the virtual devices traversed during the simulation of the virtual network topology, and
storing the accumulated set of virtual device identifiers with the flow rule in the shared database.

7. The method of claim 1, further comprising:
in response to a change in a virtual device, identifying all flow rules stored in the shared database for which the associated set of virtual device identifiers includes the virtual device identifier of a changed virtual device; and
invalidating the identified flow rules.

8. The method of claim 1, further comprising:
communicating the invalidated flow rules to each of the plurality of interconnected computing nodes such that the invalidated flow rules are invalidated from a local cache of flow rules received from the shared database.

9. A computing system comprising:
a plurality of computing nodes interconnected by a physical computing network, wherein each node includes one or more network interfaces;
a virtual network including a plurality of virtual devices operable on the plurality of computing nodes of the physical network, each virtual device having a plurality of virtual ports, with each port being either an exterior facing point associated with one of the plurality of network interfaces, or an interior facing port associated with an interior facing port of another virtual device, wherein each virtual port corresponds to one of an exterior facing port associated with one of the network interfaces of the computing nodes of the physical network, or an interior facing port associated with an interior facing port of another virtual device to form a virtual link between virtual devices;
a shared database stored on at least one of the plurality of interconnected nodes and accessible from each of the plurality of interconnected computing nodes,
the shared database containing a virtual network topology and a plurality of flow rules, wherein the virtual network topology includes at least a mapping of each exterior facing port of the plurality of virtual devices with an associated network interface of one of the plurality of nodes, a mapping that associates each interior facing port of the plurality of virtual devices with an interior facing port of another of the plurality of virtual devices; and
a decision engine operable on one or more of the plurality of computing nodes of the physical network,
wherein the decision engine is configured to:
receive a packet received at a network interface of one of the plurality of interconnected nodes,
simulate the packet's traversal of the virtual network topology from an ingress exterior facing port of a first virtual device corresponding to the network interface at which the packet was received, to an egress exterior facing port of a last virtual device corresponding to a network interface at which the packet will be emitted from the virtual network,
the simulation further including:
creating a packet protocol header pattern by identifying each field of the packet header that is read during the traversal of the virtual network topology, wherein the packet protocol header pattern includes a wildcard for any field of the packet header that was not read during the simulation by the decision engine;
determining a plurality of actions for modifying the packet header based on a configuration of each virtual device traversed by the packet during the simulation; and
communicating the packet protocol header pattern and the determined plurality of actions to the shared database, and storing the packet protocol header pattern and the determined plurality of actions as a flow rule in the shared database;
wherein the decision engine is further configured to, upon receiving a subsequent packet, select a flow rule from the shared database by matching a header of the subsequent packet with the stored packet protocol header pattern, and then modify the subsequent packet based on the determined plurality of actions of the flow rule, such that the modified subsequent packet header is configured as the subsequent packet would be emitted at the egress exterior facing port based on all the actions applied through the traversal of the virtual network topology; and
wherein the decision engine is further configured to determine that the packet should be emitted from a second network interface of a second node of the underlying network, and to cause the computing system to:
forward the packet from a first of the plurality of computing nodes to a second of the plurality of computing nodes of the physical network across the physical network as a payload of a tunneling protocol packet having a tunnel key, wherein the tunnel key encodes a globally unique identifier of one of the plurality of network interfaces of the second of the plurality of computing nodes of the physical network through which the packet will be emitted; and
emit the packet from the network interface of the second of the plurality of computing nodes without invoking the decision engine on the second of the plurality of computing nodes of the physical network.

10. The system of claim 9, wherein the determined plurality of actions are stored as an aggregate modification to be applied to the subsequent packet header.

11. The system of claim 9, wherein the simulation further includes:
accumulating a set of virtual device identifiers, wherein each virtual device identifier corresponds to one of the virtual devices traversed during the simulation of the virtual network topology, and
storing the accumulated set of virtual device identifiers with the flow rule in the shared database.

12. The system of claim 11, wherein the decision engine is further configure to:
in response to a change in a virtual device, identify all flow rules stored in the shared database for which the associated set of virtual device identifiers includes the virtual device identifier of a changed virtual device; and
invalidate the identified flow rules.

13. The system of claim 12, wherein the decision engine is further configure to communicate the invalidated flow rules to each of the plurality of interconnected computing nodes such that the invalidated flow rules are invalidated from a local cache of flow rules received from the shared database.

14. The system of claim 9, wherein the decision engine is further configured to cause the computing system to:

determine that the packet should be emitted from a set of network interfaces corresponding to an interface set identifier, wherein at least a portion of the network interfaces are located on a second of the plurality of computing nodes of the physical network, and deliver the packet to each network interface in the set of network interfaces that are local to a first of the plurality of computing nodes, and forwarding the packet from the first node to the second of the plurality of computing nodes as the payload of the tunneling protocol packet using the tunnel key that encodes the interface set identifier.

15. The system of claim 9, wherein the physical network supports multicasting, and wherein the decision engine is further configured to cause the computing system to:

map each interface set identifier to a multicast address, maintain, for each node of the physical network, a multicast subscription for each of the interface set identifiers to which at least one network interface of the node belongs, and multicast the packet as the payload of the tunneling protocol packet to at least the second node, and for each node, emit the packet from any network interfaces corresponding to the interface set that are local to that node.

16. The system of claim 9, wherein the physical network does not support multicasting, and wherein the decision engine is further configured to cause the computing system to:

determine a set of physical network nodes that have local network interfaces that belong to the set of network interfaces, forward the packet from the first node to each node in the set of underlying network nodes, and for each node, emit the packet from any network interfaces corresponding to the interface set that are local to that node.

* * * * *